(12) United States Patent
Kitamoto et al.

(10) Patent No.: US 6,227,489 B1
(45) Date of Patent: May 8, 2001

(54) AIRCRAFT SEAT APPARATUS

(75) Inventors: Mitsuo Kitamoto; Shigeru Kiguchi, both of Yokohama (JP)

(73) Assignee: Koito Industries, Ltd. (JP)

( * ) Notice: Subject to any disclaimer, the term of this patent is extended or adjusted under 35 U.S.C. 154(b) by 0 days.

(21) Appl. No.: 09/311,647

(22) Filed: May 13, 1999

(30) Foreign Application Priority Data

May 15, 1998 (JP) .................................................. 10-133623
May 15, 1998 (JP) .................................................. 10-133705

(51) Int. Cl.[7] .................................................. B64D 11/00
(52) U.S. Cl. .................................... 244/118.5; 244/118.6; 297/68; 297/86
(58) Field of Search .............................. 244/118.5, 118.6; 297/68, 84, 86, 88, 89

(56) References Cited

U.S. PATENT DOCUMENTS

| | | | |
|---|---|---|---|
| 2,947,349 | 8/1960 | Kryter | 155/130 |
| 3,958,827 | 5/1976 | Re | 297/61 |
| 4,216,991 | 8/1980 | Holobaugh | 297/85 |
| 4,216,992 | 8/1980 | Crum | 297/85 |
| 4,226,468 | 10/1980 | Johnson | 297/84 |
| 4,866,795 | 9/1989 | Dahlqvist | 5/18 R |
| 5,072,988 | 12/1991 | Plunk | 257/68 |

FOREIGN PATENT DOCUMENTS 1284706 7/1971 (GB).
WO96/18537 6/1996 (GB).

*Primary Examiner*—J. Woodrow Eldred
(74) *Attorney, Agent, or Firm*—Blakely Sokoloff Taylor & Zafman

(57) ABSTRACT

An aircraft seat apparatus installed in a cabin of an aircraft includes a seat portion, a slide mechanism, bulkheads, and a seat portion driving unit. The seat portion is movable in a back-and-forth direction. The slide mechanism supports the seat portion to be movable in the back-and-forth direction. The bulkheads support the slide mechanism to form a space under the seat portion together with the seat portion, and are fixed to a cabin floor member. The seat portion driving unit is arranged under the seat portion to move it in the back-and-forth direction.

17 Claims, 15 Drawing Sheets

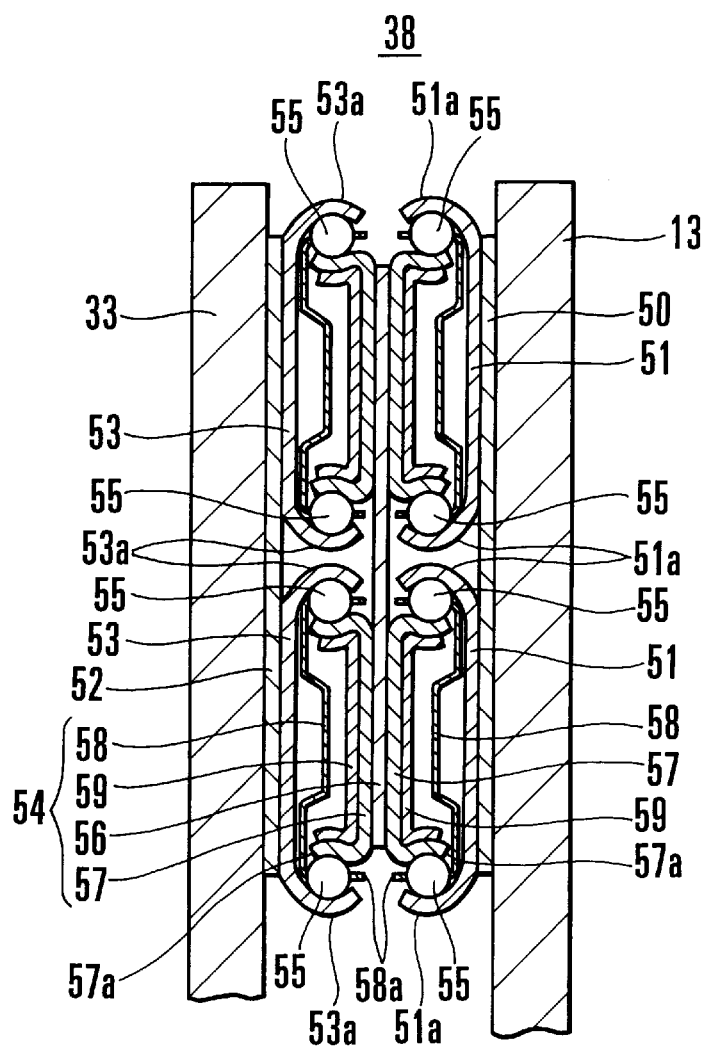
F I G. 10 A
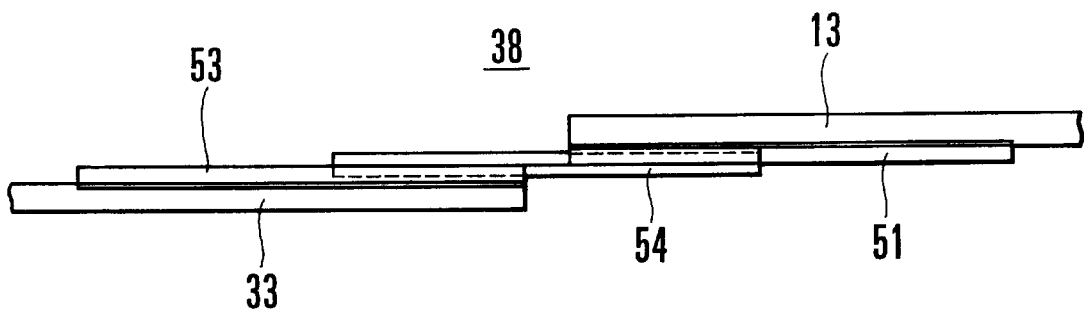
F I G. 10 B

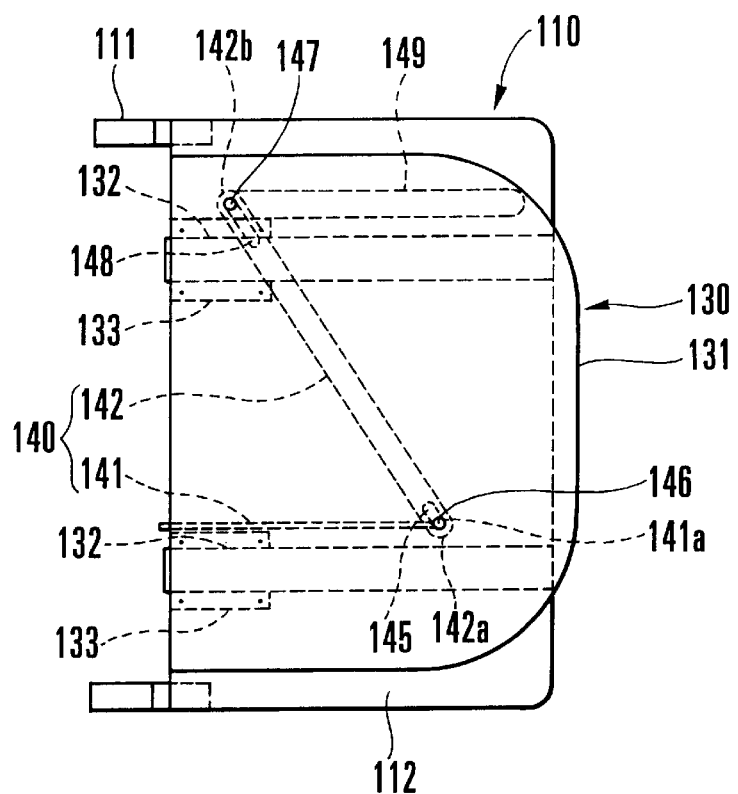
F I G. 11
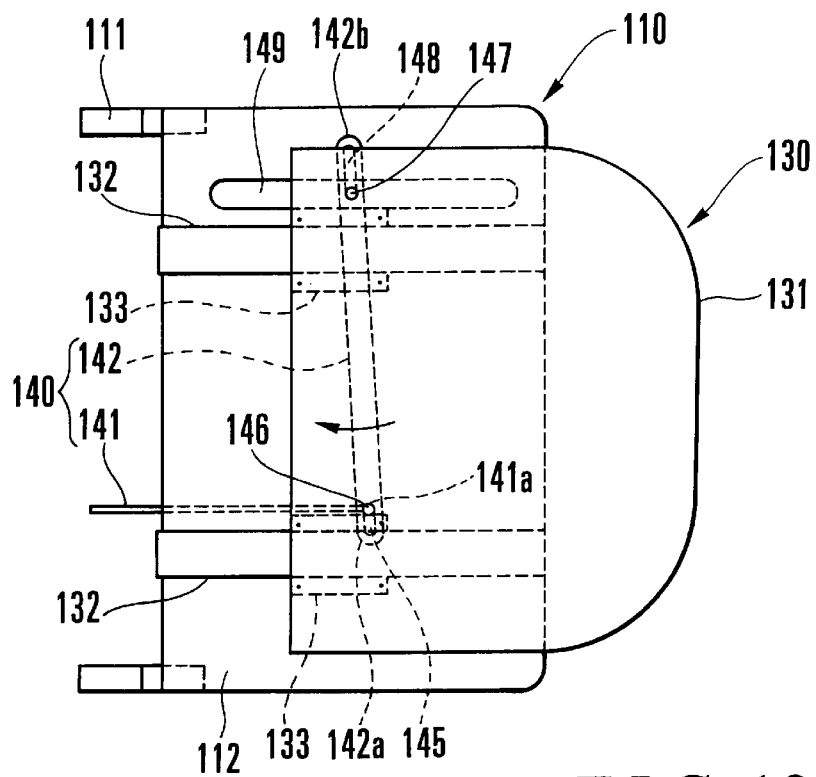
F I G. 12

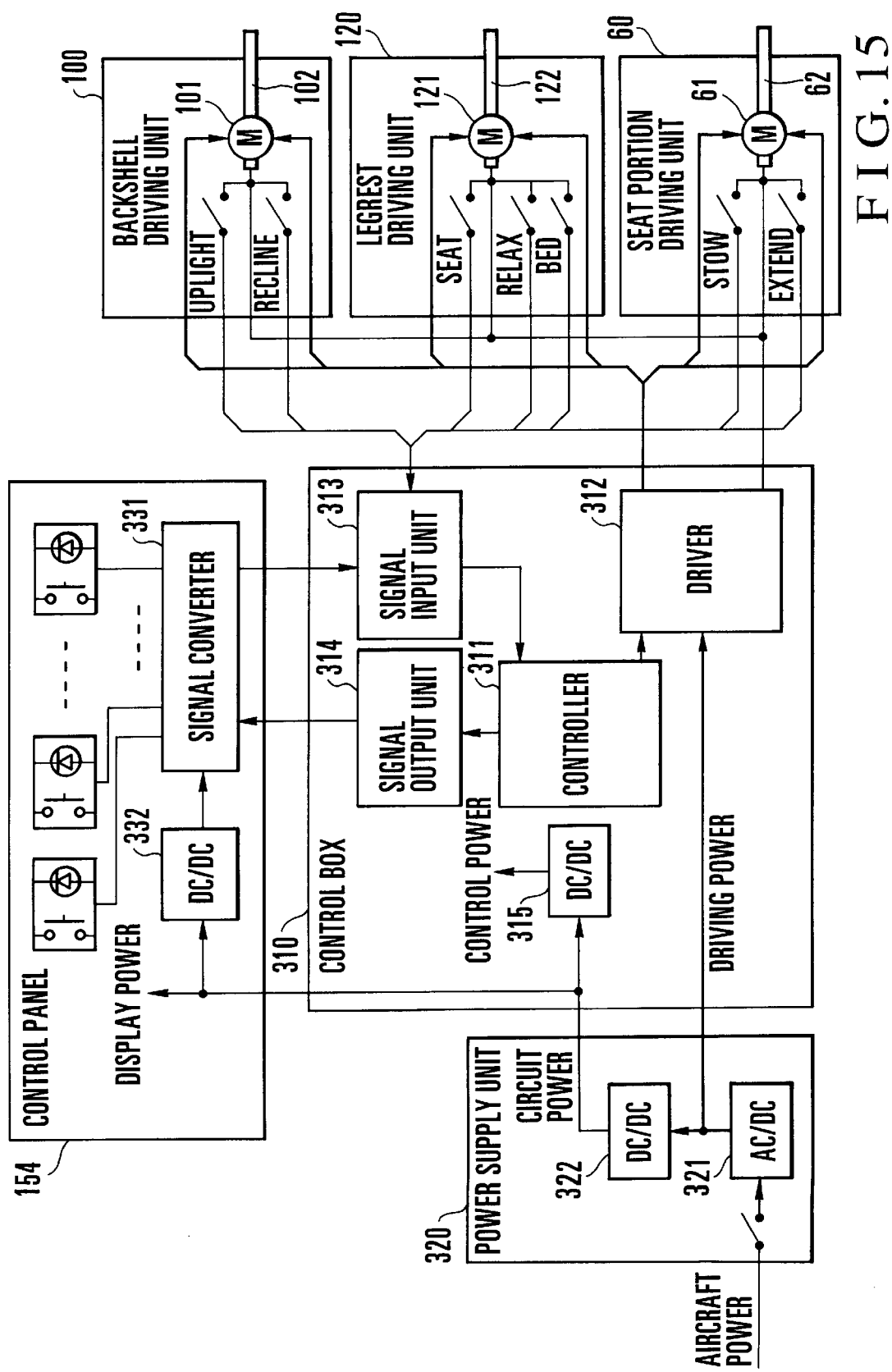
F I G. 15

AIRCRAFT SEAT APPARATUS

BACKGROUND OF THE INVENTION

The present invention relates to a seat apparatus installed in the cabin of an aircraft.

As a seat apparatus (to be referred to as a seat as well hereinafter) of this type installed in an aircraft cabin, a reclining seat, the tilt angle of which can be changed by inclining the backrest backward, is generally used.

Recently, for example, a seat disclosed in Japanese Patent Laid-Open No. 8-258796 is proposed as a seat for the first-class section.

In order to allow the passenger to have spare room and to make him feel comfortable, this seat can take three states, i.e., a state wherein the backrest is substantially upright (actually slightly inclined backward) (normal state), a state wherein the backrest is shifted forward from this state so that it is inclined backward by a predetermined angle (reclining state), and a state wherein the backrest is further largely inclined to be set in the substantially horizontal state (bed state).

Thus, a seat which serves as a reclining seat as well as a bed is formed. This seat has a backshell covering the rear side and two sides of the seat to protect the passenger's privacy.

To incline the backrest from the substantially upright normal state to the reclining state and finally to the substantially horizontal bed state, two structures ① and ② are available. According to the structure ①, the seat portion is largely moved forward and simultaneously the backrest is moved forward in the interlocked manner to set the seat surface of the seat portion and the backrest surface of the backrest in one substantially horizontal surface. According to the structure ②, the seat portion is not moved forward but merely the backrest is inclined to be finally set in the bed state through the reclining state.

With the structure ①, the seat portion largely moves forward in the bed state, and accordingly a large space is needed in front of the seat.

With the structure ② as well, the backrest is largely inclined backward, and accordingly a large space is needed behind the seat, making a back-seat passenger feel uncomfortable.

Therefore, either structure suffers large restriction when installing the seat.

In terms of human engineering, with the structure ①, when the seat portion moves forward to be set in the reclining state, a space tends to be formed between the hip and the backrest and the passenger's backbone tends to be bent, making the passenger feel uncomfortable.

With the structure ②, the backrest is largely inclined backward from the reclining state. The passenger's head is thus lowered to make him feel uncomfortable.

If the seat portion is moved forward after the backrest is set in the reclining state and the backrest in the reclining state is inclined, while being moved forward, in the interlocked manner, to be set in the substantially horizontal state, stability during motion can be improved.

When the seat portion is to be moved, if its direction (angle) is changed and the seat portion is tilted about the hip (thighs) as the center of rotation, stability during motion can be further improved.

In one of conventional aircraft seats which employs the structure ①, legs having casters are provided to a seat portion, or a trolley (Japanese Patent Laid-Open No. 8-258796) is provided to a seat portion. The seat portion is pulled forward together with the legs or trolley.

As described above, in the conventional seat, particularly a seat whose seat portion can move forward and backward, legs having casters, or a trolley is provided to the seat portion, and the seat portion is pulled out forward integrally with the legs or trolley.

If legs having casters or a trolley is provided to the seat portion, a sufficiently large space cannot be ensured under the seat portion.

Therefore, it is difficult to ensure, under the seat portion, a mounting space where driving units for driving the seat portion, the backrest, the legrest, and the like are to be mounted, and the driving units and driven members must be connected to each other through complicated links and the like.

This imposes large restriction on the driving units themselves and how to mount the driving units. Moreover, rails for the casters must be formed, increasing the number of components and the number of assembling steps.

Also, a countermeasure must be taken so the legs or trolley will not damage the floor surface or the carpet extended on the floor.

SUMMARY OF THE INVENTION

The present invention has been made in order to solve these problems, and has as its object to provide an aircraft seat apparatus in which a sufficiently large space can be formed under the seat portion, driving units have simple structures and can be easily mounted in the space under the seat portion, and the seat portion can be moved without damaging the floor surface or the carpet extended on the floor.

In order to achieve the above object, according to the present invention, there is provided an aircraft seat apparatus installed in a cabin of an aircraft, comprising a seat portion movable in a back-and-forth direction, a slide mechanism supporting the seat portion to be movable in the back-and-forth direction, a leg member supporting the slide mechanism to form a space under the seat portion together with the seat portion and fixed to a cabin floor member, and a seat portion driving unit arranged under the seat portion to move the seat portion in the back-and-forth direction.

BRIEF DESCRIPTION OF THE DRAWINGS

FIGS. 10A and 10B are sectional and plan views, respectively, showing the slide mechanism;

FIG. 11 is a view showing the state of the legrest and drawing mechanism in the normal state;

FIG. 12 is a view showing the state of the legrest and drawing mechanism in the reclining state;

FIG. 15 is a block diagram showing the control system of the seat apparatus according to the present invention;

DESCRIPTION OF THE PREFERRED EMBODIMENT

The present invention will be described in detail by way of an embodiment shown in the accompanying drawings.

Figure 1:
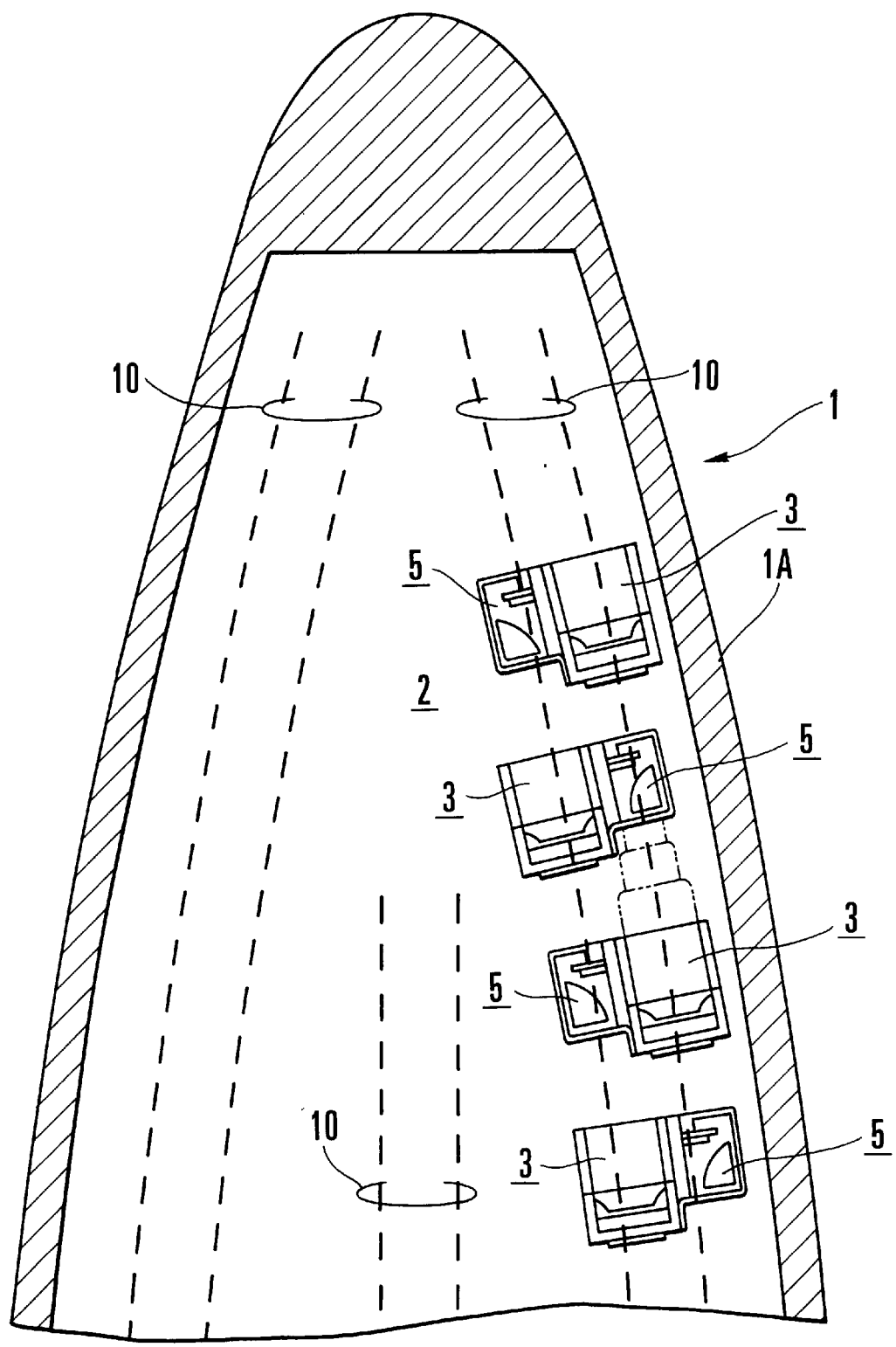
FIG. 1 is a plan view showing the first-class section of an aircraft where a seat apparatus according to the present invention is installed.
Figure 2:
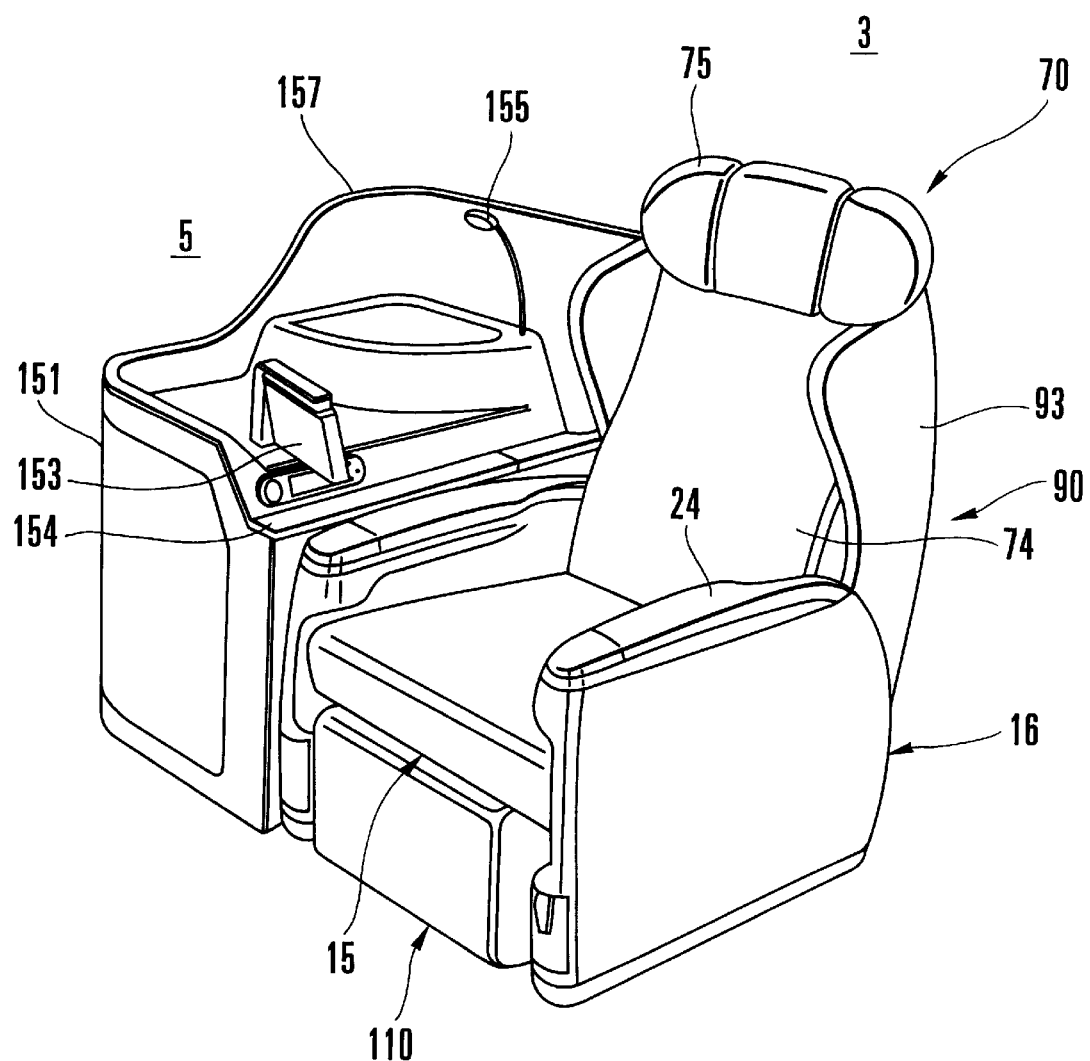
FIG. 2 is a partially cutaway perspective view showing the outer appearance of the seat apparatus seen from the front in the obliquely left direction.
Figure 3:
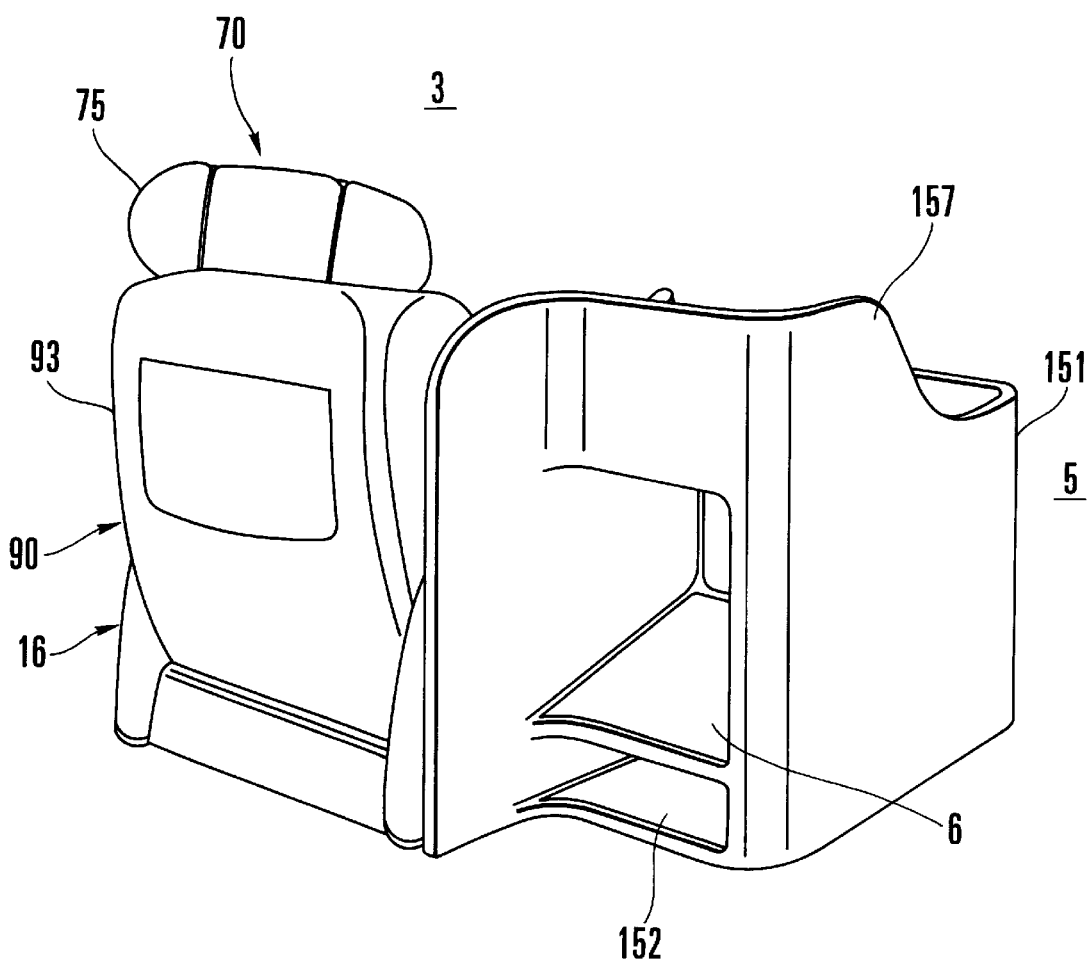
FIG. 3 is a perspective view showing the outer appearance of the seat apparatus seen from behind in the obliquely right direction.
Figure 4:
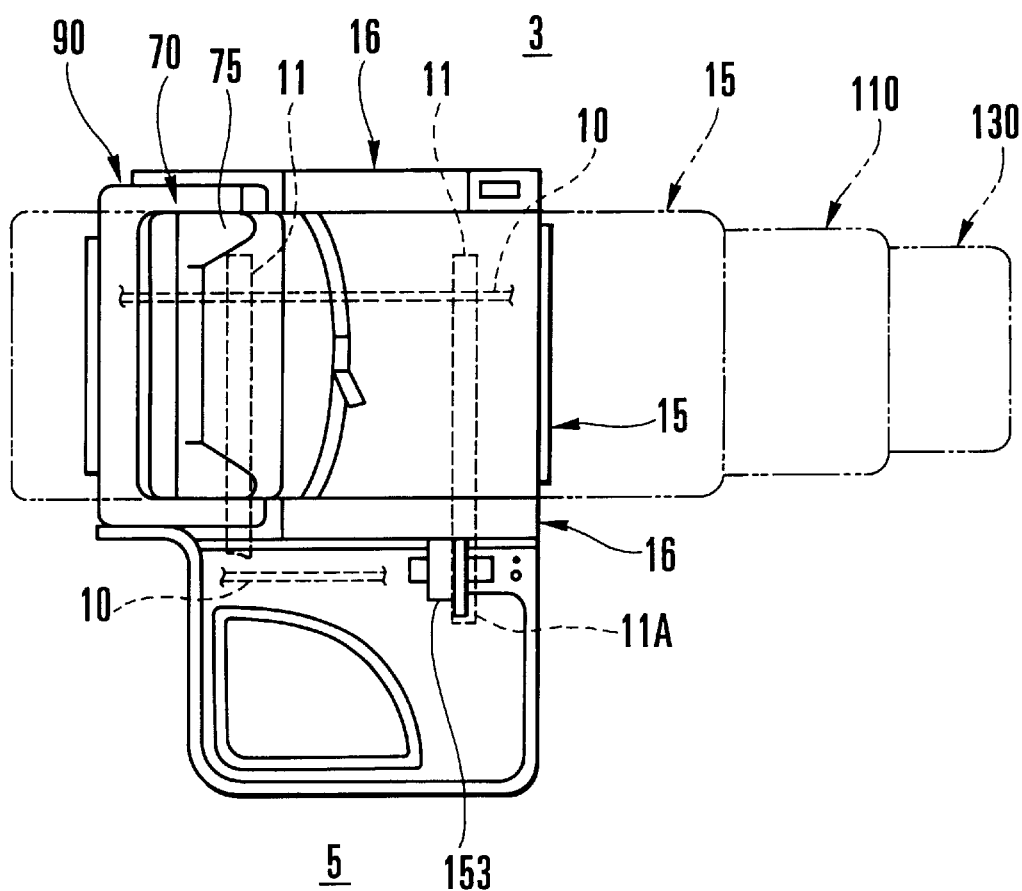
FIG. 4 is a plan view of the seat apparatus.
Figure 5:
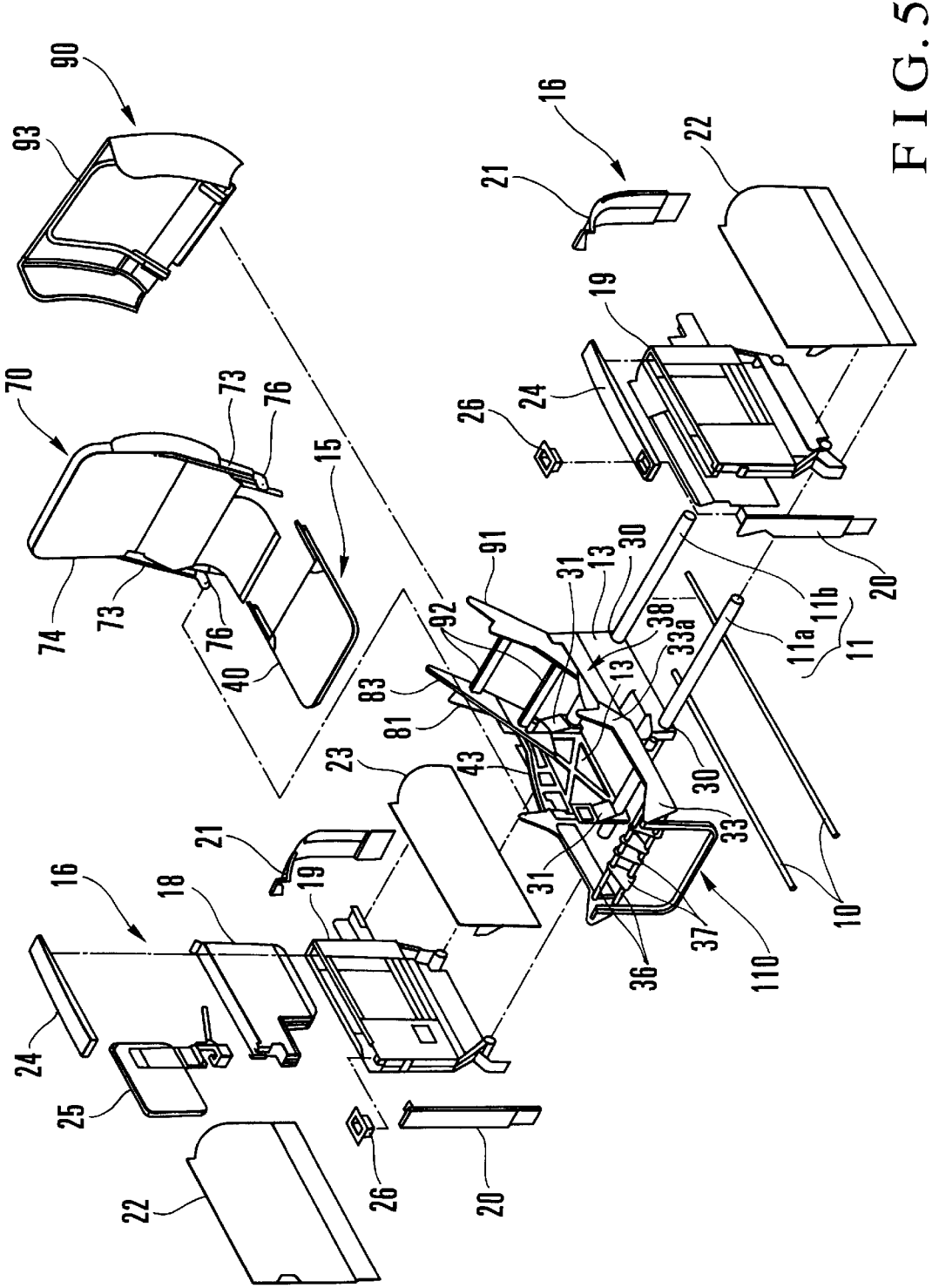
FIG. 5 is an exploded perspective view of the main constituent members of the seat apparatus.

FIG. 1 shows the first-class section of an aircraft where a seat apparatus according to the present invention is installed, FIG. 2 shows one seat apparatus seen from the front in the obliquely left direction, FIG. 3 shows the seat apparatus seen from behind in the obliquely right direction, FIG. 4 also shows the seat apparatus, and FIG. 5 shows the main constituent members of the seat apparatus.

Figure 6:
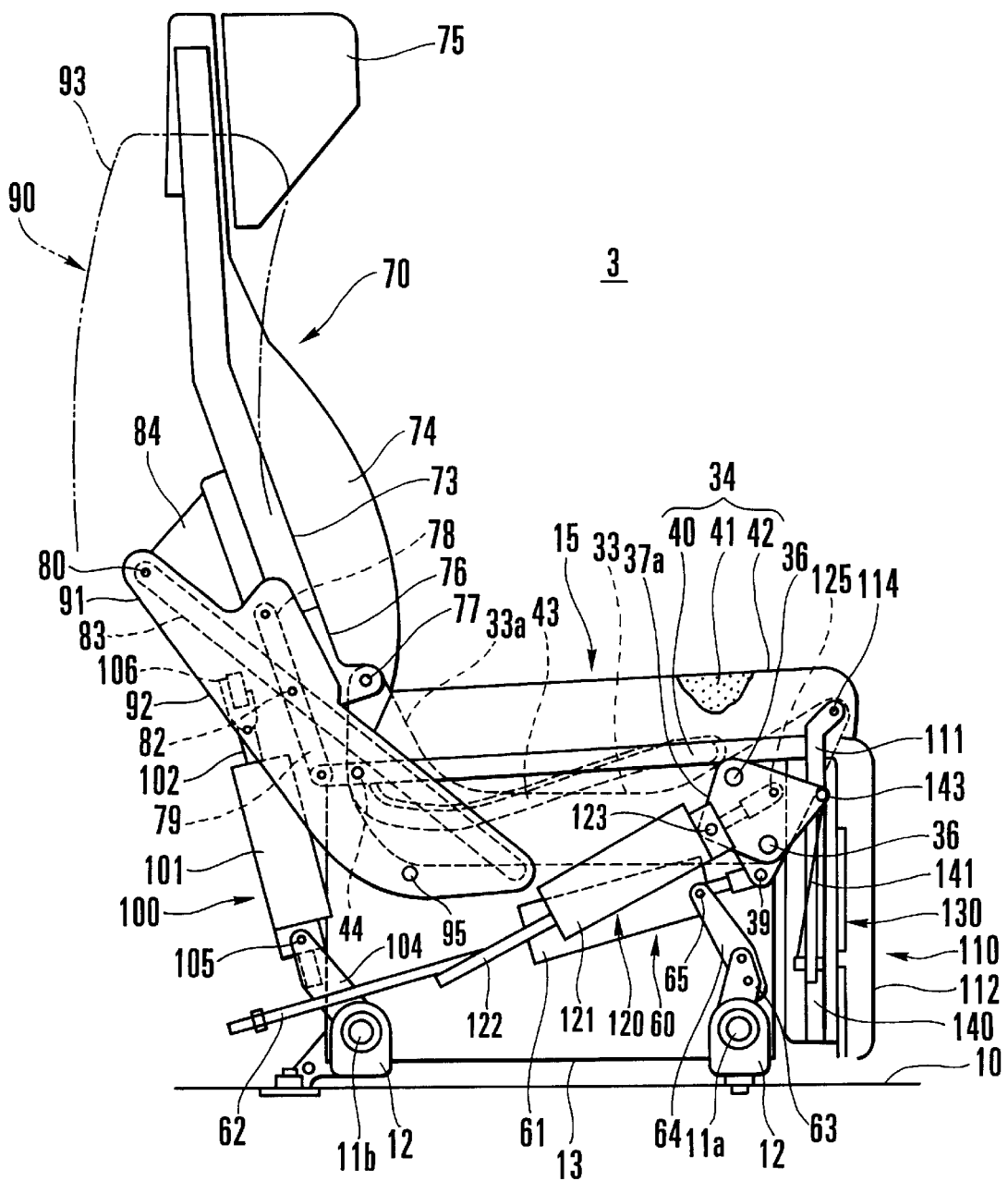
FIG. 6 is a view showing a seat portion, a backrest, a legrest, a footrest, and driving units in the normal state.
Figure 7:
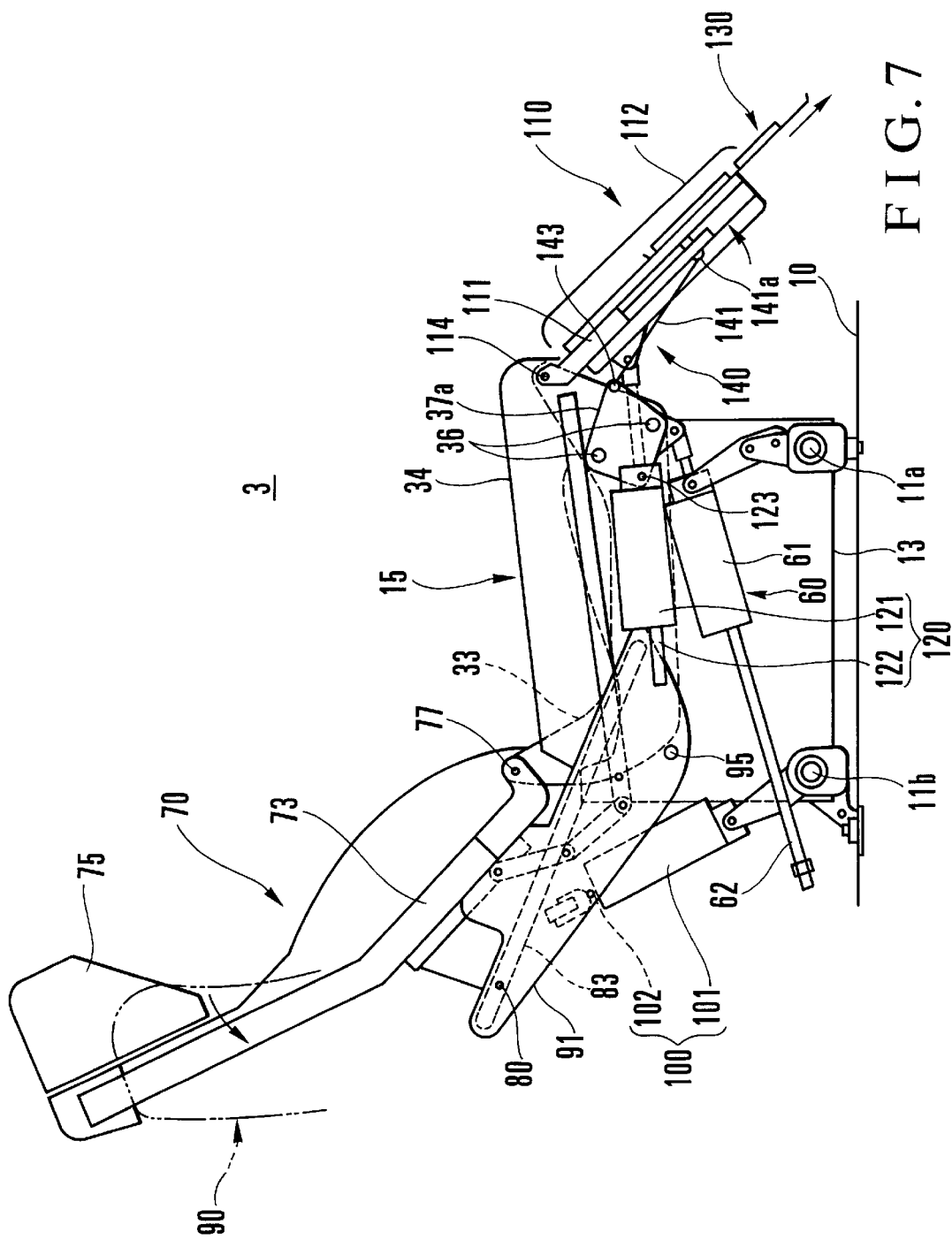
FIG. 7 is a view showing the seat portion, backrest, legrest, footrest, and driving units in the reclining state.
Figure 8:
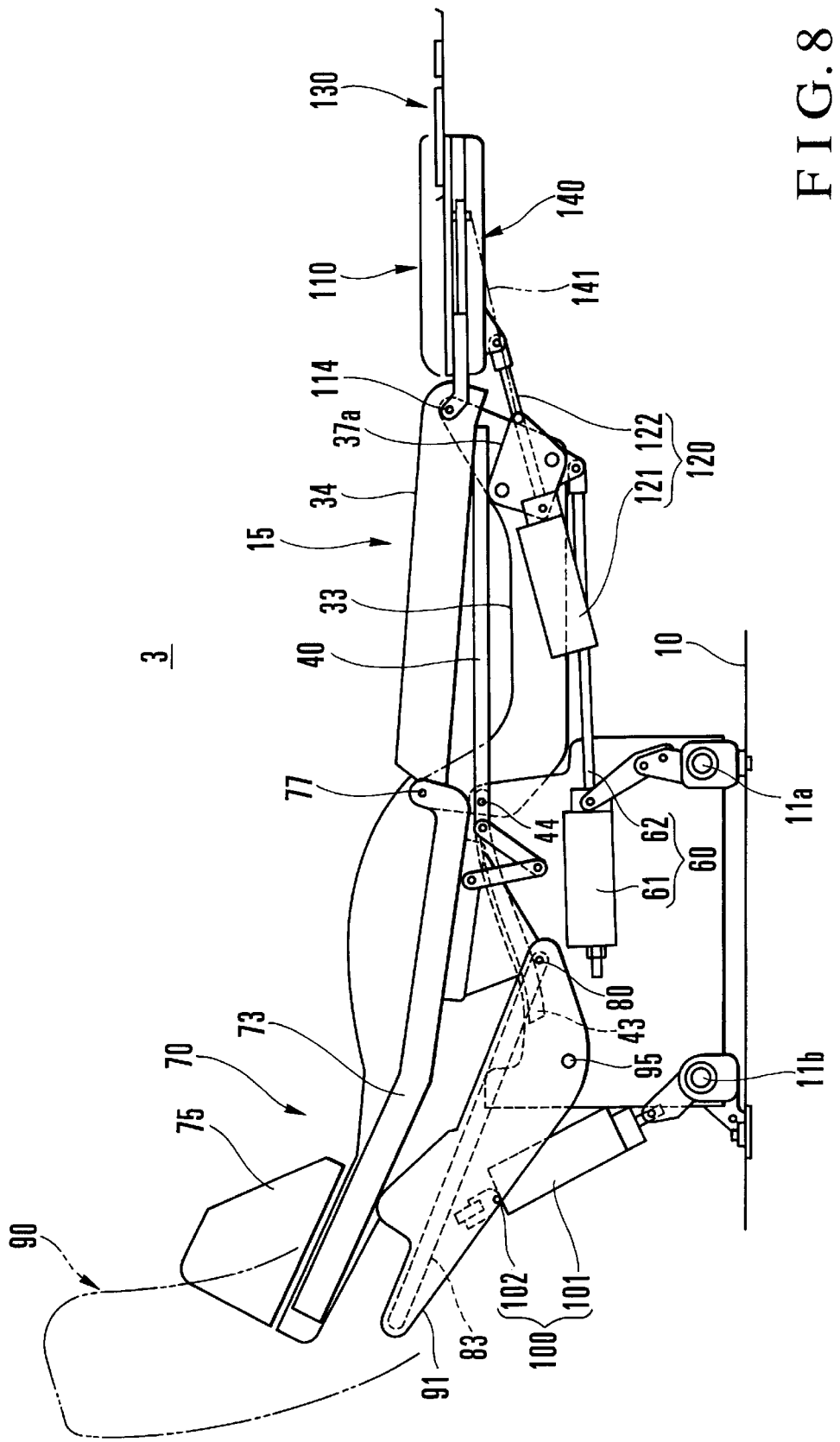
FIG. 8 is a view showing the seat portion, backrest, legrest, footrest, and driving units in the bed state.

FIG. 6 shows a seat portion, a backrest, a legrest, a footrest, and driving units in the normal state, FIG. 7 shows the seat portion, the backrest, legrest, footrest, and driving units in the reclining state, and FIG. 8 shows the seat portion, backrest, legrest, footrest, and driving units in the bed state.

Figure 9C:
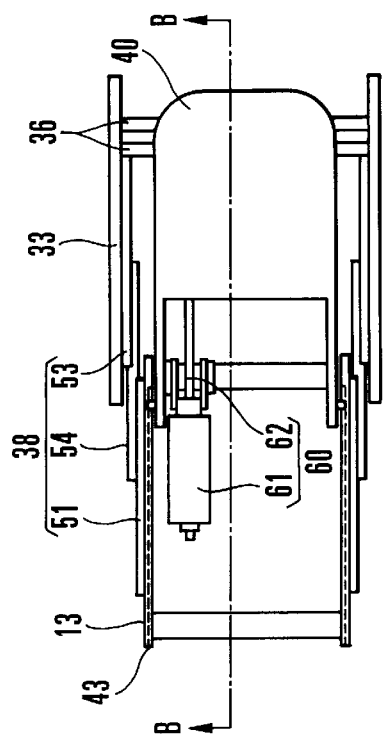
FIGS. 9A to 9D are explanatory views showing operation of a slide mechanism.
Figure 9D:
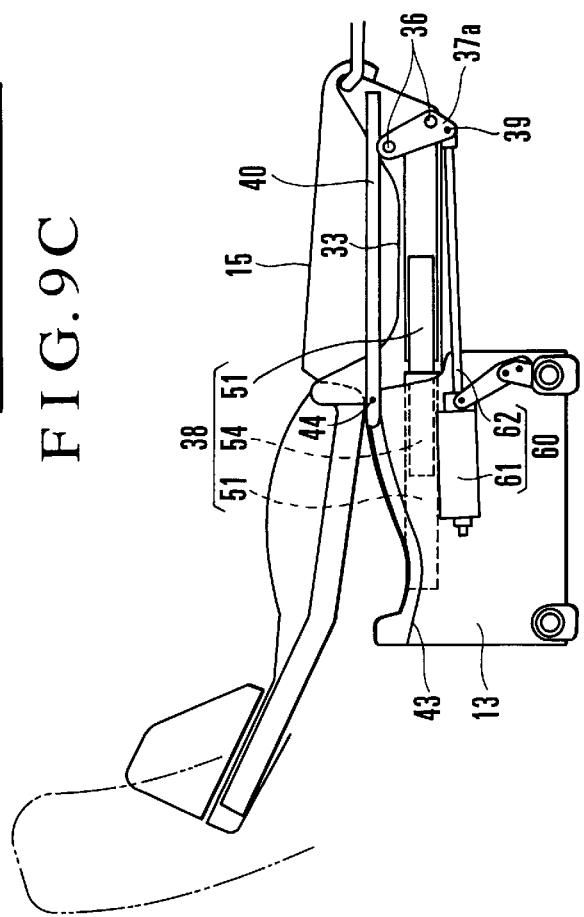
Figure 9A:
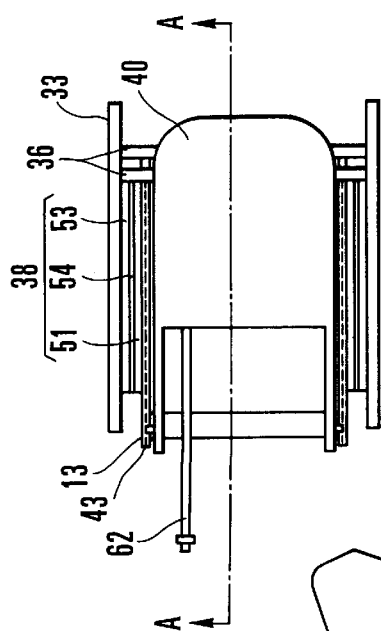
Figure 9B:
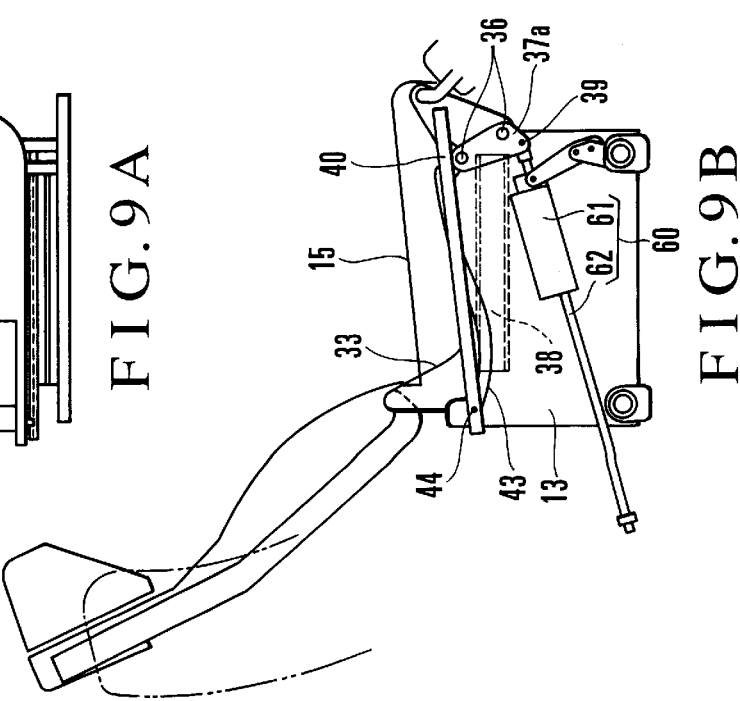

FIGS. 9A to 9D show operation of a slide mechanism, in which FIGS. 9A and 9B show the reclining state, and FIGS. 9C and 9D show the bed state.

FIGS. 10A and 10B show the slide mechanism.

This embodiment exemplifies a case wherein the present invention is applied to a single seat, serving also as a bed, which is developed for an aircraft first-class section.

This embodiment employs the structure ① described above, i.e., the structure in which the seat portion and the backrest are moved forward to be set in the bed state.

This seat apparatus also has a backshell covering the rear side and two sides of the seat to protect the passenger's privacy.

Referring to FIG. 1, a plurality of seats 3 are arranged in a cabin 2 of the first-class section of an aircraft 1 along a fuselage wall 1A at predetermined intervals in the back-and-forth direction.

These seats 3 are installed to be directed inward in the aircraft 1, i.e., obliquely with respect to the center line of the fuselage so as to be directed to the nose when the passengers are seated.

The seats 3 are arranged in the staggered manner, and each seat has a side console 5 on its one side.

The side consoles 5 are arranged in the staggered manner so that they are located inside and outside the seats 3 alternately.

Accordingly, a front-row seat 3 is located in front of each side console 5, and a rear-row seat 3 is located immediately behind each side console 5.

The seats 3 and side consoles 5 are arranged in this staggered manner so that, when the seat 3 is set in the bed state and the passenger lies down stretching his legs, the passenger can place his legs on part of a footrest 130 (to be described later) and in a storage section 6 in the side console 5 located in front of him from behind. With this arrangement, the distance between the front and rear seats can be relatively decreased.

The side console 5 will be described later.

Referring mainly to FIGS. 5 to 8, the seat 3 is fixed to seat tracks 10 installed on the floor surface of the cabin 2 through two pipes 11 (11a, 11b) so that it is detachable and adjustable in the back-and-forth direction.

Accordingly, when the pipes 11 are removed from the seat tracks 10, the seat 3 can be exchanged together with the side console 5.

As shown in FIG. 1, the seat tracks 10 constituting the cabin floor member are installed to be parallel to each other at a predetermined gap in the right-and-left direction, so that they are located under the seats 3 and side consoles 5. The seat tracks 10 extend in the longitudinal direction of the fuselage.

The two pipes 11 are formed of an extruded member of an aluminum alloy or the like, and are fixed to the floor surface through fixing metal fixtures 12 to substantially perpendicularly intersect the seat tracks 10 and to be slightly separate from the floor surface.

The two pipes 11 and the fixing metal fixtures 12 (mounting means) constitute a position adjusting means for adjusting the mount position of bulkheads 13 in a direction intersecting the extending direction of the seat tracks 10.

The pair of right and left bulkheads 13 (side support members) constituting the leg members of the seat 3 are fixed to the two pipes 11 to oppose the seat tracks 10.

Although pipes having circular sections are used as the pipes 11, the present invention is not limited to them, and pipes having other appropriate shapes can be used.

The pair of bulkheads 13 are formed of an aluminum alloy or the like into right and left plates symmetric to each other. The bulkheads 13 constitute the leg members of a seat portion 15 and are used as the frame members of right and left armrests 16 to constitute the strength member of the seat 3.

More specifically, the bulkheads 13 are fixed to the pipes 11 and hold the seat portion 15 to be movable in the back-and-forth direction, so that they serve as the legs of the seat portion 15.

As the leg members, other than the plates such as the bulkheads 13 described above, a frame member formed of columnar members such as pipes may be used. Any member can be used as far as it is a side support member, i.e., a member extending in front of and behind the seat portion 15 to support a slide mechanism 38.

The bulkheads 13 are covered with an inner panel unit 18 and a side panel unit 19. The outer side of each of the inner and side panel units 18 and 19 is covered with a front cover 20, a rear cover 21, an outside panel 22, and an inside panel 23. An arm cap 24 (see FIG. 5) is attached to the upper surface of each bulkhead 13. The armrests 16 are thus formed.

Each armrest 16 is incorporated with a drawable table 25, an ashtray 26, and the like.

Fitting holes 30 are formed in the lower end portions of the front and rear end sides of the bulkheads 13 to extend in the direction of thickness. The pipes 11 are fitted in the corresponding fitting holes 30 laterally and firmly fixed with mounting metal fixtures 31, so that the two pipes 11 and bulkheads 13 are integrally connected to each other.

The seat portion 15 has a pair of right and left slide frames 33, and a seat main body 34 set on the slide frames 33.

The pair of slide frames 33 are connected to each other at their upper end sides through upper and lower connection rods 36. The lower end of the backrest 70 (to be described later) is pivotally, axially mounted on the rear end sides of the slide frames 33.

A plurality of connection plates 37 are mounted on the connection rods 36 at appropriate gaps from each other in the axial direction.

The pair of slide frames 33 are arranged outside the bulkheads 13 to oppose them to be parallel to them, and are supported to be movable back and forth by the slide mechanism 38 (to be described later).

The seat main body 34 is constituted by a bottom frame 40, a cushion 41 placed on the bottom frame 40, a cloth 42 covering the cushion 41, and the like.

The bottom frame 40 is formed into a flat plate. The lower surface of the front end portion of the bottom frame 40 is supported by the upper surfaces of the connection rods 36, and a rotatable rolling element 44 (engaging means), e.g., a roller, is provided to the rear end side of the bottom frame 40.

The rolling element 44 is slidably inserted in guide grooves 43 (guide means) formed in the inner surfaces, along the upper edge portions, of the bulkheads 13. In the normal state wherein the backrest 70 is substantially upright, the rolling element 44 is located in the rear terminal end portions of the guide grooves 43. When the seat portion 15 is pulled forward together with the backrest 70, the rolling element 44 moves to the front terminal end portions of the guide grooves 43 along a predetermined locus (to be described later).

The front half of each guide groove 43 is arcuated in a convex manner to draw an upward moderate curve, and the rear half thereof is arcuated in a convex manner to draw a downward moderate curve. Thus, each guide groove 43 is formed into substantially an S shape as a whole.

When the backrest 70 is to be shifted from the reclining state to the substantially horizontal bed state, in the initial state of this shift, this S shape makes the rear end of the seat main body 34 to be lower than the height in the normal state, in order to incline the seat main body 34 with respect to the floor surface. When the backrest 70 becomes near the bed state, it is restored to the initial height to be substantially parallel to the floor surface.

In this manner, when the seat main body 34 is to be moved, if its angle (direction) is changed, it can be tilted about the passenger's hip as the center of rotation, so that it can be inclined smoothly without making the passenger feel uncomfortable.

As shown in FIGS. 9A to 9D and FIGS. 10A and 10B, the slide mechanism 38 of the seat portion 15 is constituted by two guide members 51, two sliders 53, an intermediate slider 54, and the like. The guide members 51 are mounted on the upper portion of the outer surface of each bulkhead 13 through a base plate 50. The sliders 53 are mounted on the inner surface of each slide frame 33 through a base plate 52. The intermediate slider 54 is interposed between the guide member 51 and slider 53.

The guide member 51 is formed into a plate and integrally has semicircularly arcuated ball receiving portions 51a which oppose each other, at its upper and lower end portions, so that it has a longitudinally elongated C sectional shape.

The slider 53 is formed to have the same shape as that of the guide member 51. Hence, the slider 53 has a longitudinally elongated C sectional shape and integrally has semicircularly arcuated ball receiving portions 53a, which oppose each other, at its upper and lower end portions.

The ball receiving portions 51a and 53a of the guide members 51 and sliders 53 are formed such that the outer and inner surfaces of each one of the portions 51a and 53a form a convex curved surface and a concave curved surface, respectively.

The intermediate slider 54 is constituted by a plate 56, ball receiving members 57, a plurality of balls 55, holders 58, reinforcing plates 59, and the like. The ball receiving members 57 are fixed in upper and lower rows on the two surfaces of the plate 56. The holders 58, together with the ball receiving members 57, rotatably hold the balls 55. The reinforcing plates 59 are fixed to the two surfaces of the plate 56.

Ball receiving portions 57a are integrally formed on the upper and lower end portions of each ball receiving member 57. Each ball receiving portion 57a is arcuated to have the same radius of curvature as that of the ball receiving portions 51a and 53a of the guide members 51 and sliders 53.

Each ball receiving portion 57a is formed such that its outer and inner surfaces form concave and convex curved surfaces, respectively. The ball receiving portion 57a, together with the ball receiving portion 51a or 53a of the guide member 51 or slider 53, forms a cylindrical space for rotatably accommodating the corresponding ball 55.

Each holder 58 is formed of a thin metal plate, and is screwed to the corresponding reinforcing plate 59 with a fixing metal fixture (not shown) not to be in contact with the ball receiving member 57.

A substantially horizontal bent portion 58a is formed at each of the upper and lower end portions of each holder 58, to be inserted between the ball receiving portion 51a and 57a or between the ball receiving portion 53a and 57a. A plurality of holes where the balls 55 are to be inserted are formed in the bent portion 58a at a predetermined interval in the longitudinal direction of the holder 58.

As shown in FIGS. 9A to 9D, when the slide mechanism 38 slidably supports the seat portion 15, the intermediate sliders 54 move forward along the guide members 51, and the sliders 53 move forward along the intermediate sliders 54. Therefore, when the backrest 70 is to be inclined to be set in the substantially horizontal bed state, the seat portion 15 can be largely pulled forward.

Since the seat portion 15 need not be supported by legs having casters or a trolley, no rails for casters need be mounted, and the space under the seat portion 15 can be utilized effectively.

Therefore, a seat portion driving unit 60, a legrest driving unit 120, and the like (to be described later) can have a simple structure, to reduce the number of components and the number of assembling steps.

These driving units can be mounted easily.

Since the seat portion 15 is held by the slide mechanism 38, it is not in contact with the floor surface. Even if the seat portion 15 moves, it does not damage the floor surface or the carpet extended on the floor.

Referring to FIGS. 5 to 8 and FIGS. 9A to 9D, the seat portion driving unit 60 and legrest driving unit 120 are disposed in the space under the seat portion 15.

In particular, the seat portion driving unit 60 is provided at a position separate from the cabin floor surface (seat tracks 10) and adjacent to the slide mechanism 38. Thus, the driving force is efficiently transmitted to the slide frames 33.

The seat portion driving unit 60 has a drive motor 61, an output rod 62 which can move back and forth, and a reduction gear mechanism (not shown) which reduces rotation of the drive motor 61 and transmits it to the output rod 62.

The front end side of the drive motor 61 is axially supported by the upper end portion of a support lever 64 through a connection pin 65 to be vertically pivotal, while the rear end side thereof is not supported at all.

Therefore, the output rod 62 moves back and forth with respect to the connection pin 65 as a torque supply point.

When the torque supply point is located in front of the space under the seat portion 15 to be adjacent to the portion under the slide mechanism 38 in this manner, the driving force of the drive motor 61 is efficiently transmitted to the slide frames 33.

The support lever 64 is attached to a bracket 63 provided to a front one (pipe 11a) of the pair of pipes 11.

The output rod 62 is constituted by a screw rod. The front end of the output rod 62 is pivotally, axially mounted on the lower end of one plate 37a, among the plurality of connection plates 37 mounted on the connection rods 36, through a connection pin 39.

As shown in FIG. 6, the plate 37a is formed into the shape of an irregular rhombus, and its three portions, i.e., its front and rear ends and lower end, are used as connecting portions.

The reduction gear mechanism of the seat portion driving unit 60 has a driven gear meshed with the output rod 62, and moves the output rod 62 back and forth in the axial direction without rotating it.

As the driven gear, a gear having a screw hole and external teeth may be used.

When the drive motor 61 is driven to move the output rod 62 forward, the plate 37a is pushed forward, and the slide frames 33 move forward along the slide mechanism 38.

Accordingly, the seat main body 34 moves forward together with the slide frames 33, so that the seat portion 15 is pulled out in front of the bulkheads 13. At this time, the rolling element 44 moves forward along the guide grooves 43 of the bulkheads 13.

The backrest 70 has a pair of right and left frames 73, a back seat 74 provided between the frames 73, a headrest 75, and the like.

Each frame 73 is formed of a V-shaped plate when seen from the side surface. A connecting metal fixture 76 fixed to the two sides of the lower end portion of the frame 73 is axially mounted on the rear end of the corresponding slide frame 33 through a connection pin 77, so that it can be inclined in the back-and-forth direction.

Portions of the rear surfaces of the frames 73 close to the lower end portions are connected to the bottom frame 40 through two links 78 and 79. Portions of the frames 73 above the links 78 and 79 are supported by frames 91, that form the reinforcing member of a backshell 90 (to be described later), through a rolling element 80 and guide grooves 83.

The connection pin 77 is axially supported by triangular projections 33a projecting from the upper surfaces of the rear end portions of the slide frames 33.

The rolling element 80 is mounted at the top portions of triangular brackets 84 mounted on the rear surfaces of the frames 73, and is rotatably inserted in the guide grooves 83 formed in the frames 91.

The backshell 90 is provided behind the backrest 70 to protect privacy of the passenger using the seat 3 and to ensure safety of the crew and passengers walking the aisle. The backshell 90 is constituted by the pair of frames 91, a plurality of connection members 92 connecting the frames 91, a backshell cover 93 mounted on the frames 91 to cover the rear side and two sides of the backrest 70, and the like.

The lower end portions of the pair of frames 91 are located between the pair of bulkheads 13. The frames 91 are axially supported by a pivot shaft 95 to be able to incline in the back-and-forth direction. Usually, the frames 91 are held inclined backward by about 40°, as shown in FIG. 6.

The guide grooves 83 are linearly formed in the inner surfaces of the frames 91, respectively, along the upper edges.

In the normal state wherein the backrest 70 is held substantially upright, the rolling element 80 is located at the upper terminal end portions of the guide grooves 83, as shown in FIG. 6.

When the backshell 90 is inclined backward by a predetermined angle from this state by a backshell driving unit 100 (to be described later), the backrest 70 is also inclined in the interlocked manner to be set in the reclining state (FIG. 7). When the backshell 90 is further inclined largely in the interlocked manner to the forward movement of the seat portion 15, the backrest 70 sinks to be held in the substantially horizontal state (FIG. 8).

At this time, as the rolling element 80 moves forward along the guide grooves 83, the backrest 70 is pushed out to sink forward while being inclined backward.

When the backrest 70 is inclined backward by the largest angle to be set in the substantially horizontal state, the rolling element 80 moves to the lower terminal end portions of the guide grooves 83.

The backshell driving unit 100 has a drive motor 101, an output rod 102 which can move back and forth, and a reduction gear mechanism (not shown) for reducing rotation of the drive motor 101 and transmitting it to the output rod 102. The backshell driving unit 100 is mounted in a space between the connection members 92 and the rear one (pipe 11b) of the pair of pipes 11.

The lower end of the drive motor 101 is pivotally connected to a bracket 104 mounted on the pipe 11b through a connection pin 105.

The output rod 102 is formed of a screw rod, and its upper end engages with the connection members 92 from below through a metal fixture 106 having a concave shape when seen from the side surface.

In the normal state, the output rod 102 projects upward for the maximum distance to support the backshell 90 in the substantially upright state. From this state, the output rod 102 is pulled downward by the driving operation of the drive motor 101.

Hence, the backshell 90 is inclined backward by a predetermined angle by its own weight and the weight of the backrest 70 about the pivot shaft 95 as the pivot center, and is stopped at a position indicated by an alternate long and two short dashed line in FIGS. 7 and 8, i.e., at the reclining position.

As in the reduction gear mechanism of the seat portion driving unit 60, the reduction gear mechanism of the backshell driving unit 100 has a driven gear meshed with the output rod 102, and moves the output rod 102 back and forth in the axial direction without rotating it.

The backshell 90 is designed to have such a height that the following conditions are satisfied. Namely, when the backshell 90 is inclined to the reclining position, the height of the backshell cover 93 should not largely change but should be slightly lower than the upper surface of the backrest 70 in the substantially upright state and the reclining state. Also, when the backrest 70 is set in the substantially horizontal bed state, the backshell 90 should be higher than the upper surface of the backrest 70, as shown in FIG. 8.

Since the backrest 70 is inclined backward and moved forward, when the backshell 90 is inclined, its backward moving amount is small.

In this manner, if the height of the backshell 90 is held substantially constant regardless of the state of the seat 3, when the crew or passengers walk the cabin aisle, they can walk while touching the backshell 90 with a natural posture. Even if the fuselage pitches or rolls, the crew or passengers will not fall down.

While the seat 3 is in the normal state or reclined state, the backshell 90 is merely located behind the backrest 70. Therefore, the passenger will not feel blocked or isolated.

In particular, when the backrest 70 is set in the substantially horizontal bed state, the backshell 90 covers the rear side and two sides of the backrest 70. When the passenger lies down, he will be less seen by other passengers, so that his privacy is protected.

The moving amount of the backshell 90, when the backshell 90 is being inclined, is small, so the back-seat passenger will not feel uncomfortable.

A legrest 110 is attached under the front end portion of the seat portion 15. The legrest 110 is constituted by a U-shaped frame 111 which opens upward, a legrest main body 112 covering the frame 111, and the like.

The two end portions of the frame 111 are pivotally, axially supported by the front end portions of the pair of slide frames 33 through connection pins 114.

The legrest main body 112 is formed into a box-like shape a lower surface of which opens when the legrest main body 112 hangs down. A cushion is formed on the upper surface of the legrest main body 112. The legrest main body 112 stores a footrest 130 and constituent members partly constituting a drawing mechanism 140 (to be described later) which projects and retracts the footrest 130 in the interlocked manner to the legrest 110.

The legrest 110 is located under the front end portion of the seat portion 15 as it is usually held in the substantially vertical state (hanging state).

When switching the seat 3 to the reclining state, the legrest 110 is pivoted upward by a legrest driving unit 120 and held in a state where it is inclined by substantially the same angle as the backrest 70, as shown in FIG. 7. When it is switched to the bed state, the legrest 110 pivots further upward, as shown in FIG. 8, to be held in the substantially horizontal state, thus forming substantially one surface together with the seat portion 15 and backrest 70.

In the bed state, the backrest 70, seat portion 15, legrest 110, and footrest 130 are not parallel to the floor surface, but form a bed surface inclined forward by about 3° or more.

While the aircraft performs normal cruising, the nose of the fuselage is kept lifted by about 3°. If the bed surface is inclined in the above manner, the passenger can lie such that his head is located to be higher than his legs.

The legrest driving unit 120 has a drive motor 121, an output rod 122 which can move back and forth, and a reduction gear mechanism (not shown) for reducing rotation of the drive motor 121 and transmitting it to the output rod 122. The legrest driving unit 120 is disposed, together with the seat portion driving unit 60, in a space between the lower surface of the seat portion 15 and the pipes 11.

The front end of the drive motor 121 is pivotally connected to the rear end of the plate 37a, mounted on the connection rods 36, through a connection pin 123, while the rear end side thereof is not supported.

The output rod 122 is formed of a screw rod, and has a front end pivotally connected to the rear surface of the legrest 110 through a connection pin 125. In the normal state, the output rod 122 is held in a state wherein it is retracted backward by the maximum length, as shown in FIG. 6.

In this state, when the drive motor 121 performs driving operation to move the output rod 122 forward, the legrest 110 is pushed from behind to gradually pivot upward about the connection pins 114 as the pivot center.

Thus, the output rod 122 projects forward by the maximum distance to be set in the substantially horizontal state, so that it becomes substantially flush with the seat portion 15 (FIG. 8).

In the same manner as the reduction gear mechanism of the seat portion driving unit 60, the reduction gear mechanism of the legrest driving unit 120 has a driven gear meshed with the output rod 122. This driven gear moves the output rod 122 back and forth without rotating it.

The legrest 110 provided to the footrest 130 will be described with reference to FIGS. 11 to 14.

Figure 13:
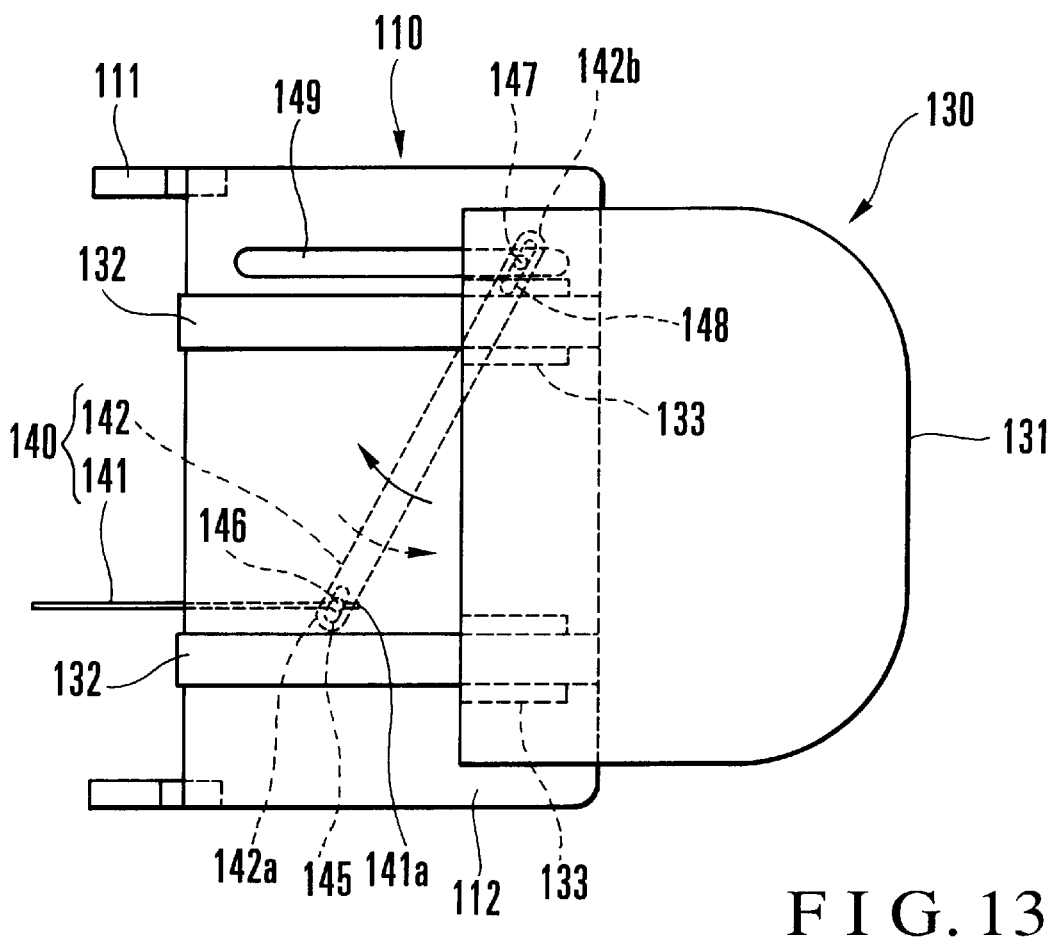
FIG. 13 is a view showing the state of the legrest and drawing mechanism in the bed state.
Figure 14:
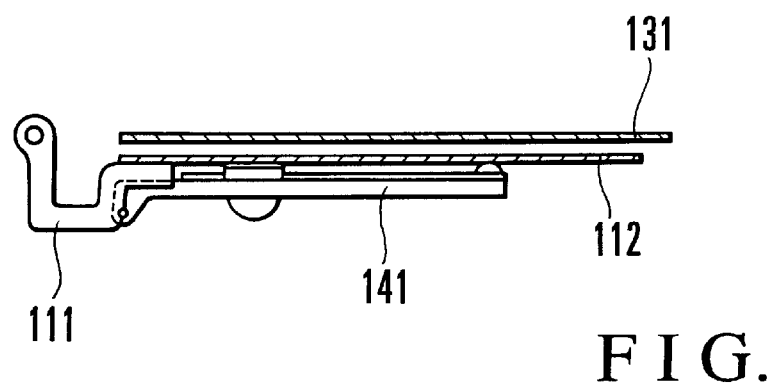
FIG. 14 is a side view of the drawing mechanism.

FIG. 11 shows the legrest and drawing mechanism in the normal state, FIG. 12 shows the legrest and drawing mechanism in the reclining state, FIG. 13 shows the legrest and drawing mechanism in the bed state, and FIG. 14 shows the drawing mechanism.

The footrest 130 has a plate-like main body 131 accommodated in the legrest main body 112 of the legrest 110, as shown in FIGS. 6 to 8 and FIGS. 11 to 14, to be able to be freely drawn from it.

The main body 131 has sliders 133 that slide along guide rails 132 formed in the legrest main body 112.

The drawing mechanism 140 of the footrest 130 has a drive arm 141 formed on the rear surface of the legrest 110, and a relay link 142 incorporated in the legrest main body 112.

The upper end of the drive arm 141 is pivotally connected to the front end-side corner portion of the connection plate 37a through a connection pin 143.

The connection pin 143 is usually located under the pivot center (centers of the connection pins 114) of the frame 111. When the footrest 130 pivots from the hanging state to be set in the horizontal state, the connection pin 143 moves backward relative to the legrest main body 112, as shown in FIG. 7.

The relay link 142 is pivotally disposed in the legrest main body 112. One end 142a of the relay link 142 is connected to a lower end 141a of the drive arm 141 through an elongated hole 145 and a pin 146, and the other end 142b thereof is connected to the main body 131 through a connection pin 147.

The connection pin 147 projects from the main body 131, extends through an elongated hole 148 formed in the other end 142b of the relay link 142, and is slidably inserted in a longitudinal groove 149 formed in the inner surface of the legrest main body 112.

While the legrest main body 112 hangs, the drive arm 141 is held in the substantially hanging state, as shown in FIG.

6, and its lower end 141a is held at the lowest position, as shown in FIG. 11.

In the state shown in FIG. 11, the relay link 142 is inclined toward the upper right.

In this state, when the legrest main body 112 pivots upward, the drive arm 141 also pivots and its lower end 141a moves to the pivot fulcrum side of the legrest main body 112.

Therefore, the relay link 142 pivots clockwise, as shown in FIG. 13, to push the main body 131 forward in front of the legrest main body 112.

Referring to FIGS. 2 and 3, the side console 5 has a console main body 151 formed into a substantially box-like shape having an upper surface slightly higher than the upper surfaces of the armrests 16. The console main body 151 is fixed to an extension 11A (FIG. 4) extending from one end of each pipe 11 through a mounting metal fixture (not shown), so that it is integrally connected to the seat 3.

The interior of the console main body 151 is open backward to form the storage section 6.

The storage section 6 is used by the back-seat passenger to insert his luggage such as a bag or to place part of the footrest 130 and his legs while he lies to take sleep.

A storage section 152 is formed under the storage section 6 to store shoes or the like.

A TV monitor 153, a control panel 154, and a reading light 155 are provided to the upper surface side of the console main body 151.

The control panel 154 has various types of control switches for actuating the driving units 60, 100, and 120 described above and for turning on/off the TV monitor 153, the reading light 155, and the like.

A screen 157 vertically extends from the rear end portion of the upper surface of the console main body 151 to block the view from behind for the purpose of protecting the passenger's privacy.

Operation of the seat described above will be described with reference to FIGS. 15 to 18.

Figure 16:
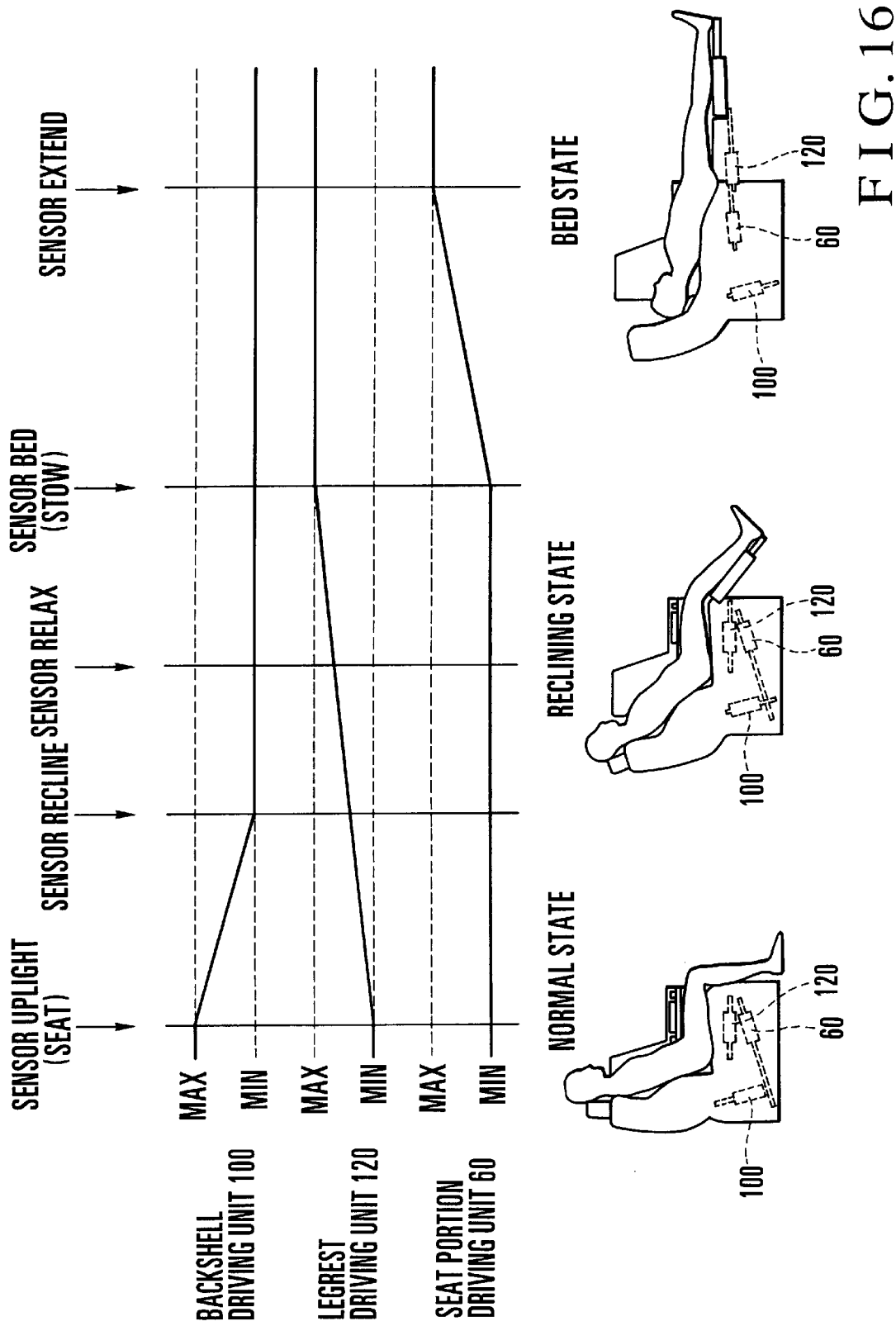
FIG. 16 is a sequence chart showing the state and control operation of the seat apparatus.
Figure 17:
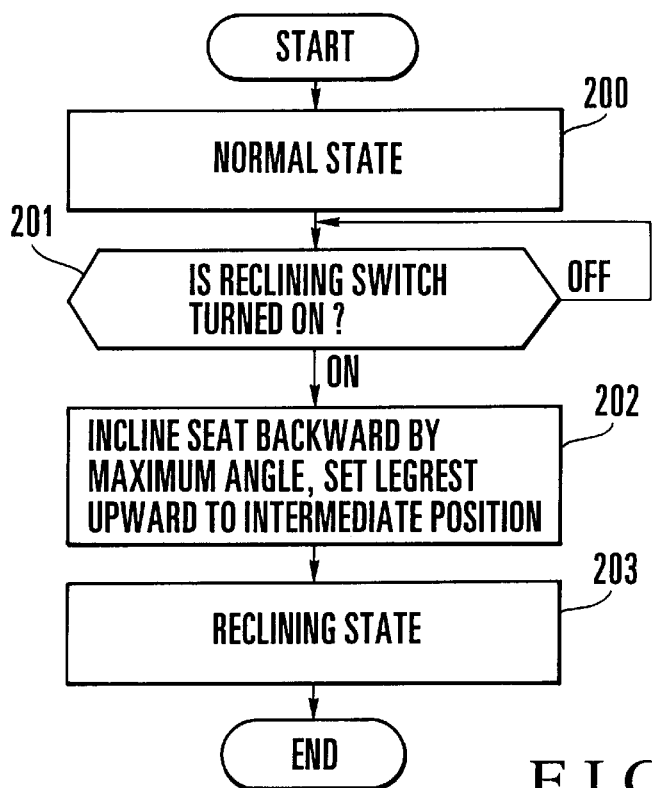
FIG. 17 is a flow chart showing how to set the seat from the normal state to the reclining state.
Figure 18:
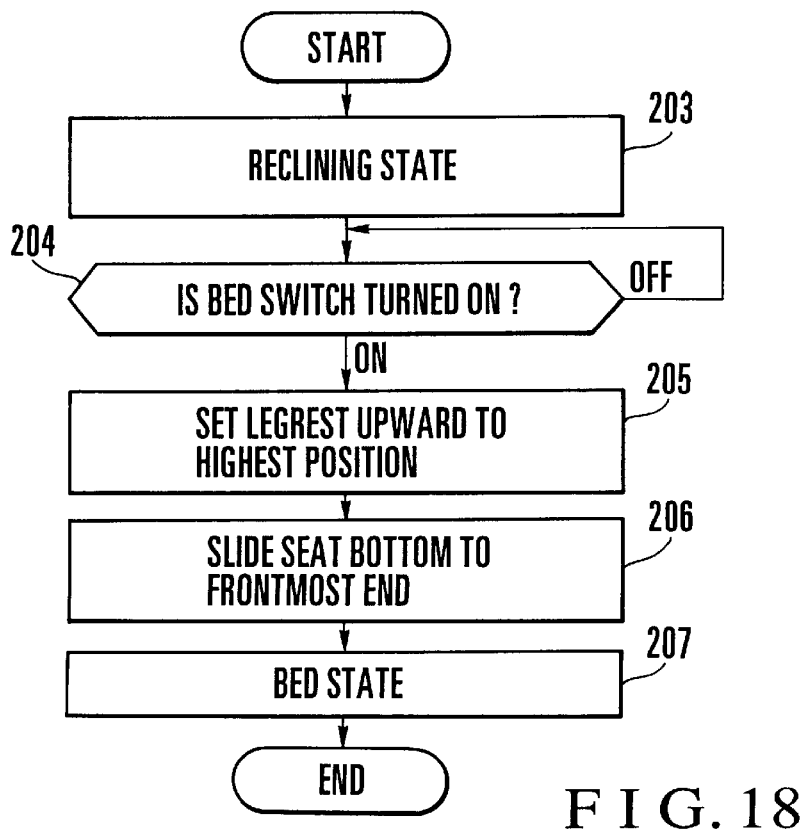
FIG. 18 is a flow chart showing how to set the seat from the reclining state to the bed state.

FIG. 15 shows the control system of the seat apparatus according to the present invention, FIG. 16 shows the state and control operation of the seat apparatus, FIG. 17 shows how to set the seat from the normal state to the reclining state, and FIG. 18 shows how to set the seat from the reclining state to the bed state.

As shown in FIG. 15, the control system of the seat apparatus is constituted by a power supply unit 320 and a control box 310. The power supply unit 320 generates power, which is to be used by the respective portions of the control system, from the aircraft power supplied from the aircraft, and outputs it. The control box 310 controls the respective driving units on the basis of an operation signal from the control panel 154 of the side console 5 or detection signals from various types of sensors provided to the respective driving units.

The power supply unit 320 has an AC/DC converter 321 and a DC/DC converter 322. The AC/DC converter 321 converts the aircraft power (AC) supplied from the aircraft into a DC current and outputs driving power having a comparatively high voltage. The DC/DC converter 322 converts this driving power into circuit operating power having a comparatively low voltage.

The control box 310 has control circuits for controlling the backshell driving unit 100, legrest driving unit 120, and seat portion driving unit 60.

As the control circuits, a signal input unit 313, a controller 311, a driver 312, and a signal output unit 314 are arranged. The signal input unit 313 receives the operation signal from the control panel 154 and the detection signals from the sensors of the driving units. The controller 311 controls the respective driving units on the basis of these signals and controls display of the control panel 154. The driver 312 controls supply of the driving power to the respective driving units on the basis of a control signal from the controller 311. The signal output unit 314 outputs a display signal for controlling display of the control panel 154 on the basis of a control signal from the controller 311.

The control panel 154 has a signal converter 331 and a DC/DC converter 332, in addition to switches for detecting operation of the user and display portions (e.g., LEDs) for indicating the operation state. The signal converter 331 converts signals from these switches into operation signals and outputs them to the control box 310, and converts a display signal from the control box 310 to control the respective display portions. The DC/DC converter 332 generates control power for operating the signal converter 331 from the circuit power from the power supply unit 320.

As the power of the display portions, the circuit power from the power supply unit 320 is used.

Each driving circuit has a driving motor for moving an output rod back and forth, and a sensor (position detection switch) which operates in accordance with the position of the output rod.

Although not shown, a safety mechanism, e.g., an overcurrent protection circuit, a temperature fuse, or furthermore a limiter switch, is provided. The limiter switch blocks driving power to the respective driving motors upon reception of a detection output from a specific sensor among the respective sensors.

In particular, the backshell driving unit 100 has a sensor UPRIGHT and a sensor RECLINE as sensors for detecting the position of the rod 102.

As shown in FIG. 16, the sensor UPRIGHT detects that the output rod 102 has moved forward by almost the maximum distance (MAX position). It is determined from this detection result that the seat is in the normal state.

The sensor RECLINE detects that the output rod 102 has moved backward by almost the maximum distance (MIN position). It is determined from this detection result that the inclining operation of the backshell 90 is complete.

The legrest driving unit 120 has a sensor SEAT, a sensor RELAX, and a sensor BED.

The sensor SEAT detects that the output rod 122 has moved backward by almost the maximum distance (MIN position). It is determined from this detection result that the seat is in the normal state.

The sensor RELAX detects that the output rod 122 has moved forward to the intermediate position. It is determined from this detection result that the seat is in the reclining state.

The sensor BED detects that the output rod 122 has moved forward by the maximum distance (MAX position). It is determined from this detection result that the legrest 110 has moved upward to almost the horizontal position.

The seat portion driving unit 60 has a sensor STOW and a sensor EXTEND.

The sensor STOW detects that the output rod 62 has moved backward by almost the maximum distance (MIN position). It is determined from this detection result that the legrest 110 has moved upward to almost the horizontal position.

The sensor EXTEND detects that the output rod 62 has moved forward by almost the maximum distance (MAX position). It is determined from this detection result that the seat is in the bed state.

As shown in FIG. 15, the detection signals from these sensors are input to the controller 311 through the signal input unit 313. The controller 311 performs a determination process in a software manner to recognize the state of the seat. The controller 311 then outputs a control signal to the driver 312 to instruct the driving motor of each driving unit to perform forward rotation or reverse rotation, or to stop.

The driver 312 controls output of the driving power from the power supply unit 320 on the basis of this control signal. The driving motors of the respective driving units are thus controlled to perform forward rotation or backward rotation, or to stop.

Operation performed when the seat 3 is to be shifted from the normal state to the reclining state will be described with reference to FIG. 17.

When the seat 3 is in the normal state (step 200), the backrest 70 and backshell 90 are held in the substantially upright state, as shown in FIG. 6.

The legrest 110 is held in the hanging state, and the footrest 130 is completely accommodated in the legrest 110.

To switch the seat 3 from this normal state to the reclining state, mode selection is performed, and a relax switch provided to the control panel 154 is operated to actuate the drive motor 101 of the backshell driving unit 100 (step 201).

This pulls down the output rod 102, so that the frames 91 are gradually inclined backward about the pivot shaft 95 as the pivot center.

Hence, the backshell 90 is shifted from the state indicated by an alternate long and two dashed line in FIG. 6 to the reclining state indicated by an alternate long and two dashed line in FIG. 7 wherein it is inclined backward by a predetermined angle.

At this time, the backrest 70 is inclined backward in the interlocked manner to the backshell 90, so that it is also set in the reclining state.

More specifically, when the frames 91 of the backshell 90 pivot backward about the pivot shaft 95 as the pivot center, the frames 73 of the backrest 70 are inclined about the connection pin 77 about the pivot center, and the rolling element 80 moves obliquely downward and forward along the guide grooves 83 of the frames 91.

As a result, the backrest 70 is inclined backward by a predetermined angle to be set in the reclining state.

In this manner, the switching operation of the seat 3 from the normal state to the reclining state is performed by inclining the backrest 70 backward by the predetermined angle with the backshell driving unit 100 through the backshell 90.

The drive motor 121 of the legrest driving unit 120 is also driven so that the output rod 122 pushes the legrest 110 forward. Hence, the legrest 110 pivots upward about the connection pins 114 as the pivot center to be inclined by a predetermined angle.

When the legrest 110 pivots, the drive arm 141 pulls one end 142a of the relay link 142 backward, and accordingly the other end 142b of the relay link 142 pivots clockwise about the pin 147 as the pivot center, as shown in FIG. 12.

The pin 147 moves toward the front end side of the legrest 110 along the elongated groove 149.

As a result, the footrest 130 projects forward from the legrest 110 by a predetermined amount, so that the seat 3 is set in the reclining state (step 203).

Since the seat portion driving unit 60 does not perform driving operation, the seat portion 15 and backrest 70 do not move forward.

To restore the seat 3 from the reclining state to the substantially upright normal state, mode selection may be performed and the backshell driving unit 100 is driven, so that the output rod 102 is moved upward to push up the frames 91, thereby setting the backrest 70 upright.

At this time, the legrest driving unit 120 is also driven.

Therefore, the legrest 110 is pulled down to be restored to the initial hanging state, and the footrest 130 is accommodated in the legrest 110 by the drawing mechanism 140.

FIG. 18 shows how to shift the seat 3 from the reclining state to the bed state. To shift the seat 3 from the reclining state (step 203) shown in FIG. 7 to the bed state shown in FIG. 8, the bed switch of the control panel 154 is operated (step 204).

When the bed switch is operated, the legrest driving unit 120 is actuated first to pivot the legrest 110 further upward from the inclined state, to set it in the substantially horizontal state shown in FIG. 8. The legrest 110 thus becomes substantially flush with the seat portion 15.

At this time, the footrest 130 is further pulled out from the legrest 110 by the drawing mechanism 140, to project in front of the legrest 110 (step 205).

Then, the seat portion driving unit 60 performs driving operation to move the seat portion 15 forward (step 206).

At this time, the slide frames 33 are moved forward linearly by the slide mechanism 38 shown in FIG. 10.

Meanwhile, since the rolling element 44 moves along the S-shaped guide grooves 43 of the bulkheads 13, as described above, the seat main body 34 moves forward in the first half of the motion stroke while changing its direction. When the seat main body 34 has moved forward by a predetermined distance, it is restored in the initial substantially horizontal state.

When the seat portion 15 moves forward, the backrest 70 is dragged by the seat portion 15 to move forward, and is simultaneously inclined backward by the maximum angle, so that it is set in the substantially horizontal state.

In other words, since the backrest 70 is connected to the slide frames 33 through the connection pin 77, as the seat portion 15 moves forward, it moves forward together with the slide frames 33.

Since the rolling element 80 moves downward along the guide grooves 83, the backrest 70 is inclined backward about the connection pin 77 as the pivot center.

As a result, the backrest 70, seat portion 15, legrest 110, and footrest 130 become substantially flush with each other and set in the bed state (step 207).

To switch the reclining state to the bed state, the seat portion 15, and the legrest 110 and footrest 130 operate with a time lag.

More specifically, after the legrest 110 and footrest 130 are set in the substantially horizontal state, the seat portion 15 is moved forward.

When the seat portion 15, and the legrest 110 and footrest 130 operate with a time lag in this manner, even if luggage or the like is present on the floor surface in front of the legrest 110, it does not interfere with the motion of the legrest 110 or footrest 130, and the seat 3 can be reliably set in the bed state.

To restore the bed state to the reclining state, mode selection may be performed and the bed switch described above may be operated.

At this time, the drive motor 61 performs driving operation first, in the opposite manner to that described above, to move the output rod 62 backward. The seat portion 15 thus moves backward to restore the initial normal position, and the backrest 70 moves backward interlocked with the seat portion 15.

The backshell driving unit 100 also performs driving operation to pivot the backrest 70 through the frames 91, to set it in the reclining state.

Subsequently, the legrest driving unit 120 performs driving operation to pivot the legrest 110 downward by a predetermined angle. The footrest 130 moves backward interlocked with the legrest 110, and is accommodated substantially half in the legrest 110.

More specifically, when the legrest 110 pivots downward from the substantially horizontal state, the drive arm 141 moves forward relative to the legrest 110 from the state shown in FIG. 13, to push one end 142a of the relay link 142 forward. The relay link 142 thus pivots counterclockwise in FIG. 13 to move the connection pin 147 to the left along the longitudinal groove 149, so that the footrest 130 is moved backward.

As a result, the footrest 130 is accommodated substantially half in the legrest 110 and switched from the bed state to the reclining state.

To switch the bed state directly to the substantially upright normal state, mode selection may be performed and the bed switch may be operated.

In this case, the backrest 70 does not stop temporarily at the reclining position, but pivots to restore the substantially upright state.

The legrest 110 also pivots downward to hang, and the footrest 130 is completely accommodated in the legrest 110.

As a result, the bed state is switched directly to the substantially upright normal state.

To switch the substantially upright normal state directly to the bed state as well, mode selection may be performed and the bed switch may be operated.

In this case, the backshell driving unit 100 performs driving operation first to incline the backrest 70 by a predetermined angle. Then, the legrest driving unit 120 performs driving operation to set the legrest 110 and footrest 130 in the substantially horizontal state.

After that, the seat portion driving unit 60 performs driving operation to move the seat portion 15 forward, so that the backrest 70 is further inclined backward largely and is set in the substantially horizontal state.

As a result, the backrest 70, seat portion 15, legrest 110, and footrest 130 become substantially flush with each other to switch the substantially upright normal state to the substantially horizontal bed state.

In this manner, in the seat 3 according to the present invention, the seat portion 15 is supported to be able to move back and forth by the slide mechanism 38. When the backrest 70 is inclined to be switched from the reclining state to the substantially horizontal bed state, the seat portion 15 can be pulled out forward by a predetermined stroke.

The seat portion 15 need not be supported by legs having casters or a trolley, and rails for casters need not be installed, so that the space under the seat portion 15 can be utilized effectively.

Therefore, the seat portion driving unit 60 and legrest driving unit 120 can be formed to have a simple structure, so that the number of components and the number of assembling steps can be reduced.

The seat portion driving unit 60 and legrest driving unit 120 can be mounted easily.

The seat portion 15 and slide mechanism 38 are not in contact with the floor surface. Even when the seat portion 15 moves, it does not damage the floor surface or the carpet extended on the floor.

The slide mechanism 38 is constituted by the guide members 51, sliders 53, and intermediate slider 54, and is disposed in the space between the bulkhead 13 and slide frame 33. The slide mechanism 38 accordingly does not influence mounting of other mechanisms and members, or the passenger. A seat whose seat portion 15 has a large motion stroke can be obtained.

The seat 3 can be switched among the three states, i.e., the normal substantially upright state, the reclining state, and the bed state. During a long-time flight, the passenger cannot only be seated but can lie back, or can lie to take sleep. As a result, the passenger can have spare room and feel comfortable.

In this embodiment, the pair of front and rear pipes 11 are fixed to the seat tracks 10, and the pair of right and left bulkheads 13 are set upright on the pipes 11 to oppose each other to be parallel to each other. The present invention is not limited to this embodiment at all, but can be applied to a seat in which a seat portion 15 is disposed on a leg member, having four legs, to be movable back and forth.

In this embodiment, the slide mechanism 38 is constituted by the guide members 51, the sliders 53, and the intermediate slider 54 interposed between the sliders 53 and guide members 51. However, the present invention is not limited to this embodiment. If the motion stroke of the seat portion 15 is short, the slide mechanism 38 may be constituted by guide members and sliders.

In this manner, according to this embodiment, the backshell 90 can protect the passenger's privacy and improve the safety of the walker walking the aisle.

More specifically, when the backrest 70 is inclined through the maximum angle to be set in the substantially horizontal state, the backshell 90 is inclined to the reclining position to cover the rear side and two sides of the backrest 70. When the passenger lies on the seat 3, he cannot be easily seen from other passengers. The privacy of the passenger lying on the seat 3 can thus be protected.

Usually, the backshell 90 is located behind the backrest 70 and does not cover its two sides. The passenger does not feel blocked or isolated but can feel comfortable.

Even when the backshell 90 is switched from the substantially upright normal state to the inclined reclining state, its height does not largely change. The crew or passengers walking the cabin aisle can walk while touching the backshell 90 with a natural walking posture.

Even if the fuselage pitches or rolls, the crew or passengers will not fall down.

The seat can be inclined with a small moving amount so it does not make the back-seat passenger feel uncomfortable.

After the legrest 110 pivots upward to be completely set in the substantially horizontal state, the seat portion 15 is actuated to move forward. Even if luggage or the like is placed on the floor surface in front of the seat 3, the legrest 110 does not abut against it to break it, or the legrest 110 will not be broken down.

The backrest 70 is inclined interlocked with the backshell 90, so that it is set in the reclining state. After that, when the seat portion 15 moves forward, the backrest 70 moves forward in the interlocked manner to the seat portion 15, while it is further inclined largely, so that it is set in the substantially horizontal state. Hence, in terms of human engineering, the backrest 70 has stability during motion.

The seat 3 can be switched among the three states, i.e., the normal substantially upright state, the reclining state, and the bed state. During a long-time flight, the passenger cannot only be seated but can lie back, or can lie to take sleep. As a result, the passenger can have spare room and feel comfortable.

In this manner, according to this embodiment, the pair of front and rear pipes 11 are fixed to the seat tracks 10 installed on the floor surface, and the pair of right and left bulkheads 13 are set upright on the pipes 11 to oppose each other to be parallel to each other. The seat portion driving unit 60, the legrest driving unit 120, and furthermore the backshell driving unit 100 can be disposed in the space between the seat portion 15 and pipes 11 by using the pipes 11.

Therefore, the seat portion driving unit 60, backshell driving unit 100, and legrest driving unit 120 can be mounted easily and installed to be separate from the floor surface.

Since the pipes 11 are used as the connecting members for connecting the right and left bulkheads 13, the mounting strength of the seat 3 can be increased.

In this case, of the pair of bulkheads 13, only their lower end sides are firmly fixed to the pipes 11, and their upper end sides are not connected to each other. Since the gap between the upper ends of the bulkheads 13 is held constant by the slide frames 33 of the seat portion 15, the frames 73 of the backrest 70, the frames 91 of the backshell 90, the pivot shaft 95, and the like, the bulkheads 13 can sufficiently stand an external force applied from aside.

In this embodiment, the backshell 90 is provided to protect the passenger's privacy. The backshell 90 is inclined by the backshell driving unit 100, and the backrest 70 is inclined interlocked manner with the backshell 90. In a seat not having a backshell 90, its backrest 70 may be inclined directly by the backshell driving unit 100.

In this case, if the backshell driving unit 100 is disposed in a space under the seat portion 15 by using the pipes 11, the space behind the seat 3 can be utilized effectively.

The seat 3 can be switched among the three states, i.e., the normal substantially upright state, the reclining state, and the bed state. During a long-time flight, the passenger cannot only be seated but can lie back, or can lie to take sleep. As a result, the passenger can have spare room and feel comfortable.

While the seat 3 is in the bed state, the backshell 90 covers the rear side and two sides of the backrest 70. The passenger thus cannot be easily seen from other passengers, so that the passenger's privacy can be protected.

As a result, the passenger can feel more comfortable. Even in the bed state, the backshell 90 is inclined backward only slightly, so it does not make the back-seat passenger feel uncomfortable.

The side console 5 has the storage section 6 opening backward. The back-seat passenger can store his luggage in the storage section 6 and can place his legs in it when he lies back.

As a result, the distance between the front and rear seats can be relatively decreased.

In this embodiment described above, the present invention is applied to the first-class seat 3 having the backshell 90, legrest 110, and footrest 130. The present invention is not limited to this embodiment at all, but can be similarly applied to a first-class seat not having a backshell 90, and a business-class or economy-class seat not having a backshell 90, legrest 110, and footrest 130.

The present invention is not limited to a single-type seat, but can also be applied to a seat in which a plurality of seats are integrally connected to each other with pipes 11, in place of side consoles 5.

In this embodiment, the seats are installed obliquely with respect to the center line of the fuselage so that they are directed to the nose when the passengers are seated. However, the present invention is not limited to this, but the seats can be installed to face the fuselage wall. Alternatively, the seats may be installed to be perpendicular to the center line of the fuselage such that they are parallel to each other.

In the embodiment described above, the seat 3 has the backshell 90 that can be inclined freely. However, the seat 3 can have a backshell 90 which cannot be inclined but is fixed.

As has been described above, in the aircraft seat apparatus according to the present invention, the seat portion is supported to be able to move back and forth by the slide mechanism. When switching the backrest from the reclining state to the substantially horizontal bed state, the seat portion can be pulled out forward by a predetermined stroke.

Since the seat portion need not be supported by legs having casters or a trolley, no rails for casters need be mounted. The space under the seat portion can be utilized widely, and the seat portion driving unit and the legrest driving unit can be formed to have a simple structure, thereby reducing the number of components and the number of assembling steps.

These driving units can be mounted easily.

Regarding the seat portion and the slide mechanism, they are not in contact with the floor surface. Even when the seat portion moves, it does not damage the floor surface or the carpet extended on the floor.

What is claimed is:

1. An aircraft seat apparatus installed in a cabin of an aircraft, comprising:
    a seat portion,
    a slide mechanism supporting said seat portion to be movable in a back-and-forth direction;
    a leg member supporting said slide mechanism together with said seat portion and fixed to a cabin floor member of an aircraft; and
    a seat portion driving unit arranged under said seat portion and making said seat portion move in the back-and-forth direction,
    wherein, said leg member has formed a predetermined size space between the portion under a seat portion and said cabin floor member.

2. An apparatus according to claim 1, further comprising position adjusting means, formed between seat tracks and said leg member, for adjusting a mounting position of said leg member in a direction intersecting an extending direction of said seat tracks, said seat tracks constituting said cabin floor member, extending on a cabin floor surface in a longitudinal direction of a fuselage, and arranged side by side to be separated from each other in a direction intersecting the longitudinal direction.

3. An apparatus according to claim 2, wherein said position adjusting means comprises
    a plurality of pipes extending to intersect the back-and-forth direction, arranged in the back-and-forth direction to be parallel to each other, and fixed to said plurality of seat tracks to intersect said plurality of seat tracks, and mounting means for adjustably mounting said leg member to said pipes.

4. An apparatus according to claim 1, wherein said leg member comprises two side support members extending in the back-and-forth direction and arranged side by side to be separated from each other in a direction perpendicularly intersecting the back-and-forth direction to oppose each other.

5. An apparatus according to claim 1, wherein said slide mechanism comprises sliders fixed to slide frames for guiding said seat portion in the back-and-forth direction, an intermediate slider supporting said sliders to be movable in the back-and-forth direction, and a guide member fixed to said leg member and supporting said intermediate slider to be movable in the back-and-forth direction.

6. An apparatus according to claim 1, wherein said seat portion driving unit is arranged at a position separate from a cabin floor surface under said seat portion and adjacent to said slide mechanism.

7. An apparatus according to claim 6, wherein said seat portion driving unit comprises a driving section having a torque supply point at a position in a front portion of a space under said seat portion and adjacent to a portion below said slide mechanism, and a rod which is connected to a front portion of said slide frames that guide said seat portion in the back-and-forth direction and which moves in the back-and-forth direction through said torque supply point in response to driving operation of said driving section.

8. An apparatus according to claim 1, wherein said seat portion has a bottom frame supported at a front portion of said slide frames to be vertically pivotal about lower portions of front sides of said slide frames as a fulcrum, and said bottom frame has engaging means engageable with guide means extending in the back-and-forth direction and provided to said leg member, and when said engaging means moves along said guide means in accordance with movement of said slide frames, said bottom frame vertically pivots about said fulcrum as a center.

9. An apparatus according to claim 1, wherein said apparatus has a legrest provided to a front portion of said seat portion and supported to be vertically pivotal about a rear portion thereof as a fulcrum, and when said seat portion is located at a rear position, said legrest is folded downward, and when said seat portion is to move forward, said legrest pivots upward in advance about said fulcrum as a center to a substantially horizontal position.

10. An apparatus accordingto claim 1, wherein said apparatus further comprises a legrest supported at a front portion of said seat portion to be vertically pivotal about a rear portion thereof as a fulcrum, a backrest having a lower end connected to said seat portion and inclined from a substantially upright state to a substantially horizontal state through a reclining state, and a backshell provided behind said backrest to be able to be inclined and formed to be lower than a height of said backrest when said backrest is in one of the substantially upright state and the reclining state, and when said backrest is inclined by a maximum angle to become substantially horizontal, said backshell is inclined and held at a reclining position such that an upper surface height thereof is higher than said backrest.

11. An apparatus according to claim 10, wherein when a mode of setting said backrest and said legrest in a bed state is selected, control operation is performed so that said backrest is set in the reclining state and then said backrest and said seat portion move forward from the reclining state, and prior to forward movement of said seat portion, said legrest pivots upward to be set in the substantially horizontal state.

12. An apparatus according to claim 10, wherein said backrest can be inclined from the substantially upright state to the substantially horizontal state through the reclining state and has said backshell therebehind, and said backshell is formed so as to cover a rear side of said backrest when said backrest is held in the substantially upright state, and a rear side and two sides of said backrest when said backrest is inclined to be set in the substantially horizontal state.

13. An apparatus according to claim 3, wherein said apparatus further comprises a side console arranged adjacent to said seat portion, and said side console is fixed to each of said pipes.

14. An apparatus according to claim 3, wherein each of said pipes has an extension for fixing another seat apparatus arranged adjacent to said seat portion.

15. An aircraft seat apparatus installed in a cabin of an aircraft, comprising:

a plurality of seats arranged in said cabin to be adjacent to each other; and position adjusting means, formed between seat tracks and leg members of each of said seats, for adjusting a mounting position of said leg member of each of said seats in a direction intersecting an extending direction of said seat tracks, said seat tracks constituting said cabin floor member, extending on a cabin floor surface in a longitudinal direction of a fuselage, and arranged side by side to be separated from each other in a direction intersecting the longitudinal direction, each of said seats including a seat portion movable in a back-and-forth direction, a slide mechanism supporting said seat portion to be movable in the back-and-forth direction, said leg member supporting said slide mechanism to form a space under said seat portion together with said seat portion and fixed to a cabin floor member, and a seat portion driving unit arranged under said seat portion to move said seat portion in the back-and-forth direction, and said position adjusting means including a plurality of pipes extending to intersect the back-and-forth direction, arranged in the back-and-forth direction to be parallel to each other, and fixed to said plurality of seat tracks to intersect said plurality of seat tracks, and mounting means for adjustably mounting said leg member to said pipes.

16. An aircraft seat apparatus installed in a cabin of an aircraft, comprising:

a seat portion, a slide mechanism supporting said seat portion to be movable in a back-and-forth direction;

a leg member supporting said slide mechanism together with said seat portion and fixed to a cabin floor member of an aircraft;

a seat portion driving unit arranged under said seat portion and making said seat portion move in the back-and-forth direction;

a legrest installed to a front portion of a seat portion and arranged to be vertically pivotal about a rear end thereof as a fulcrum;

a backrest having a lower end connected to said seat portion and inclined from a substantially upright state to a substantially horizontal state through a reclining state; and a backrest driving unit for inclining said backrest from a substantially upright state to a substantially horizontal state through a reclining state, wherein, said leg member has formed a predetermined size space between the portion under a seat portion and said cabin floor member.

17. An aircraft seat apparatus installed in a cabin of an aircraft, comprising:

a seat portion, a slide mechanism supporting said seat portion to be movable in a back-and-forth direction;

a leg member supporting said slide mechanism together with said seat portion and fixed to a cabin floor member of an aircraft;

a seat portion driving unit arranged under said seat portion and making said seat portion move in the back-and-forth direction;

a legrest installed to a front portion of a seat portion and arranged to be vertically pivotal about a rear end thereof as a fulcrum;

a backrest having a lower end connected to said seat portion and inclined from a substantially upright state to a substantially horizontal state through a reclining state;

a backrest driving unit for inclining said backrest from a substantially upright state to a substantially horizontal state through a reclining state; and a backshell provided behind said backrest to be able to be inclined and formed to be lower than a height of said backrest when said backrest is in one of the substantially upright state and the reclining state, wherein, said leg member has formed a predetermined size space between the portion under a seat portion and said cabin floor member.

* * * * *